(12) United States Patent
Soliman et al.

(10) Patent No.: US 11,542,444 B2
(45) Date of Patent: Jan. 3, 2023

(54) DESALTING PLANT SYSTEMS AND METHODS FOR ENHANCED TIGHT EMULSION CRUDE OIL TREATMENT

(71) Applicant: Saudi Arabian Oil Company, Dhahran (SA)

(72) Inventors: Mohamed Soliman, Ras Tanura (SA); Khalid Alanazi, Dhahran (SA); Samusideen Adewale Salu, Ras Tanura (SA); Talal Al-Zahrani, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/241,805

(22) Filed: Apr. 27, 2021

(65) Prior Publication Data

US 2021/0309922 A1 Oct. 7, 2021

Related U.S. Application Data

(60) Division of application No. 16/858,372, filed on Apr. 24, 2020, now Pat. No. 11,034,893, which is a
(Continued)

(51) Int. Cl.
| | |
|---|---|
| *C10G 33/02* | (2006.01) |
| *B01D 17/04* | (2006.01) |
| *B03C 11/00* | (2006.01) |
| *C10G 33/08* | (2006.01) |
| *C02F 1/40* | (2006.01) |
| *C10G 32/02* | (2006.01) |

(Continued)

(52) U.S. Cl.
CPC ........... *C10G 33/02* (2013.01); *B01D 17/045* (2013.01); *B01D 17/06* (2013.01); *B03C 11/00* (2013.01); *C02F 1/40* (2013.01); *C02F 1/463* (2013.01); *C10G 32/02* (2013.01); *C10G 33/08* (2013.01); *B03C 2201/02* (2013.01)

(58) Field of Classification Search
CPC ................................. C10G 33/02; B01D 17/06
See application file for complete search history.

(56) References Cited

U.S. PATENT DOCUMENTS

| | | | |
|---|---|---|---|
| 1,802,090 A | * 4/1931 | Roberts | ................. C10G 33/06 |
| | | | 516/197 |
| 1,838,911 A | 12/1931 | Eddy | |

(Continued)

FOREIGN PATENT DOCUMENTS

| | | |
|---|---|---|
| AT | 390013 B | 4/2008 |
| CN | 201581056 U | * 9/2010 |

(Continued)

OTHER PUBLICATIONS

Cui et al., Machine Translation, CN 203187636 U (Year: 2013).*
(Continued)

*Primary Examiner* — Ho-Sung Chung
(74) *Attorney, Agent, or Firm* — Bracewell LLP; Constance G. Rhebergen; Brian H. Tompkins

(57) ABSTRACT

Systems and methods for treating a rag layer in a gas oil separation plant. The method includes withdrawing the rag layer from a vessel proximate an oil water interface, conveying the rag layer to a separation device, and recycling separated oil from the separation device back to the gas oil separation plant process.

20 Claims, 16 Drawing Sheets

Related U.S. Application Data continuation-in-part of application No. 16/680,178, filed on Nov. 11, 2019, now abandoned, which is a division of application No. 15/866,100, filed on Jan. 9, 2018, now Pat. No. 10,513,663.

(51) Int. Cl.
*C02F 1/463* (2006.01)
*B01D 17/06* (2006.01)

(56) References Cited

U.S. PATENT DOCUMENTS

| | | | |
|---|---|---|---|
| 1,974,451 A | 9/1934 | Fisher | |
| 2,033,429 A | 3/1936 | Hanson et al. | |
| 2,033,567 A | 3/1936 | Worthington | |
| 2,045,465 A | 6/1936 | Hassler | |
| 2,355,678 A * | 8/1944 | Roberts | C10G 31/08 204/570 |
| 2,817,500 A | 12/1957 | Robinson | |
| 2,830,957 A * | 4/1958 | Rhodes | C10G 33/06 516/143 |
| 3,117,920 A | 1/1964 | Stenzel | |
| 4,116,790 A | 9/1978 | Prestridge | |
| 4,180,457 A | 12/1979 | Popp et al. | |
| 4,257,895 A * | 3/1981 | Murdock | B01D 17/0211 210/DIG. 5 |
| 4,283,290 A | 8/1981 | Davies | |
| 4,308,127 A | 12/1981 | Prestridge et al. | |
| 4,391,698 A | 7/1983 | Wagner | |
| 4,415,426 A | 11/1983 | Hsu et al. | |
| 4,702,815 A | 10/1987 | Prestridge et al. | |
| 5,612,490 A * | 3/1997 | Carlson | G01N 33/2823 210/708 |
| 5,643,431 A | 6/1997 | Sams et al. | |
| 5,647,981 A | 7/1997 | Prevost et al. | |
| 5,746,908 A | 5/1998 | Mitchell | |
| 5,861,089 A | 1/1999 | Gatti et al. | |
| 6,136,174 A | 10/2000 | Berry et al. | |
| 6,391,268 B1 | 5/2002 | Berry et al. | |
| 8,747,658 B2 | 6/2014 | Love | |
| 8,790,509 B2 | 7/2014 | Vu | |
| 8,981,174 B2 | 3/2015 | Wines | |
| 9,023,213 B2 | 5/2015 | Sams | |
| 9,238,183 B2 | 1/2016 | Sams et al. | |
| 9,499,748 B2 | 11/2016 | Daage et al. | |
| 10,023,811 B2 | 7/2018 | Soliman et al. | |
| 10,119,080 B2 | 11/2018 | Albert et al. | |
| 10,260,010 B2 | 4/2019 | Soliman | |
| 10,370,948 B2 | 8/2019 | Lawson et al. | |
| 2004/0094483 A1 | 5/2004 | Mueller | |
| 2008/0257739 A1 | 10/2008 | Sams et al. | |
| 2009/0159426 A1 * | 6/2009 | Chen | C10G 33/02 422/186.04 |
| 2013/0026082 A1 | 1/2013 | Al-Shafei et al. | |
| 2013/0327646 A1 | 12/2013 | Sams et al. | |
| 2014/0131254 A1 * | 5/2014 | Soliman | C10G 31/08 208/187 |
| 2014/0202929 A1 * | 7/2014 | Mason | B01D 21/34 700/272 |
| 2014/0251874 A1 | 9/2014 | Barroeta et al. | |
| 2015/0152340 A1 | 6/2015 | Cherney et al. | |
| 2015/0291456 A1 | 10/2015 | Findikoglu | |

FOREIGN PATENT DOCUMENTS

| | | | |
|---|---|---|---|
| CN | 201581056 U | | 9/2010 |
| CN | 203187636 U | * | 9/2013 |
| CN | 203187636 U | | 9/2013 |
| GB | 709626 | | 6/1954 |
| GB | 886908 | | 1/1962 |
| WO | 2010134822 A1 | | 11/2010 |

OTHER PUBLICATIONS

Liu et al., Machine Translation, CN 201581056 U (Year: 2010).*
Related U.S. Appl. No. 15/399,591, filed Jan. 5, 2017.
Related U.S. Appl. No. 15/259,197, filed Sep. 8, 2016.
The International Search Report and Written Opinion for related PCT application PCT/US2019/012639 dated Apr. 9, 2019. (SA5766).
Davoust, Electrocoalescence Eau-Huile Emulsions: Versune, Dec. 31, 2011.
Havard Devold, Abb Gas Oil Separation Plant, found at http://www04.abb.com/global/seitp/seitp202.nsf/0/f8414ee6c6c6813f5548257c14001f11f2/$file/Oil+and+gas+production+handbook.pdf, Aug. 2013.
J. Eow, et al., Electrostatic Enhancement of Coalescence of Water Droplets in Oil: A Review of the Current Understanding, Chemical Engineering Journal 84, (2001) 173-172.

* cited by examiner

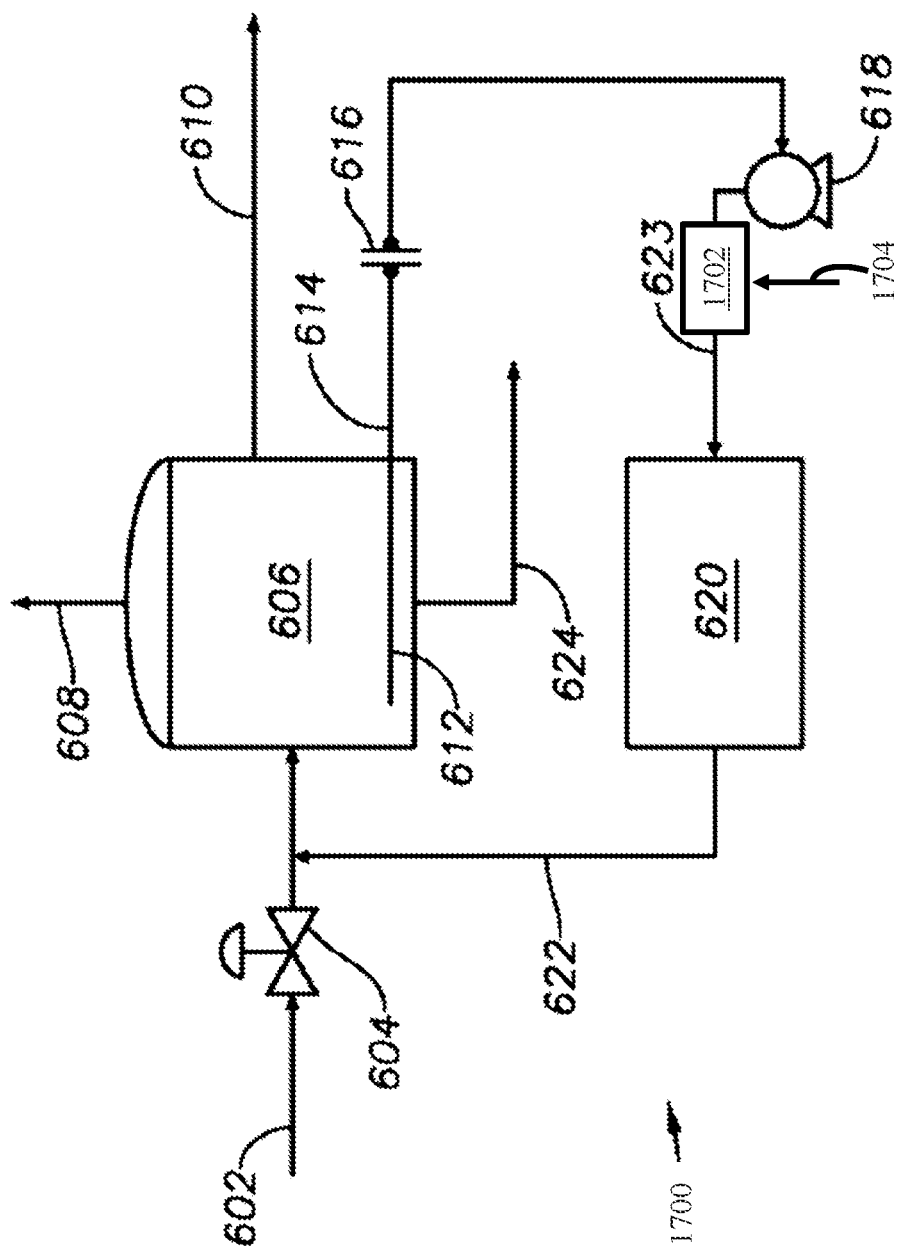

DESALTING PLANT SYSTEMS AND METHODS FOR ENHANCED TIGHT EMULSION CRUDE OIL TREATMENT

PRIORITY

This application is a divisional application of U.S. patent application Ser. No. 16/858,372, filed Apr. 24, 2020, which itself is a continuation-in-part application of U.S. patent application Ser. No. 16/680,178, filed on Nov. 11, 2019, which itself is a divisional application of U.S. patent application Ser. No. 15/866,100, filed Jan. 9, 2018, and issued as U.S. Pat. No. 10,513,663 on Dec. 24, 2019, the entire disclosures of which are incorporated here by reference.

BACKGROUND

Field

The present disclosure relates to gas oil separation plant (GOSP) technology. In particular, the disclosure relates to the automated, in addition to or alternative to continuous, removal and treatment of the interface layer (rag layer) between oil and water in separation vessels for oil-water emulsions.

Description of the Related Art

In general, a GOSP is a continuous separation process used to refine crude oil, which includes a high pressure production trap (HPPT), a low pressure production trap (LPPT), a low pressure degassing tank (LPDT), a dehydrator unit, first and second stage desalting units, a water/oil separation plant (WOSEP), a stabilizer column, centrifugal pumps, heat exchangers, and reboilers. In a GOSP, vessel pressure is often reduced in several stages to allow for the controlled separation of volatile components, such as entrained vapors. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

However, a large pressure reduction in a single separator will cause flash vaporization, leading to instability and safety hazards. Thus, in prior art GOSP's, many stages and units are required. In a first stage, gas, crude oil, and free water are separated. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications.

GOSP's are oftentimes operated to meet the following specifications for crude oil: (1) a salt concentration of not more than about 10 pound (lbs.) of salt/1,000 barrels (PTB); (2) BSW of not more than about 0.3 volume percent (V %); (3) $H_2S$ content (concentration) of less than about 60 ppm in either the crude stabilization tower (or degassing vessels in the case of sweet crude); and (4) a maximum RVP of about 7 pounds per square inch absolute (psia) and a maximum true vapor pressure (TVP) of about 13.5 psia at 130 degrees Fahrenheit (° F.).

Prior art GOSP systems also suffer from the following issues: transformer tripping and inefficient energy usage; off-specification crude oil production in terms of BSW and salt content; high operating costs required to meet the crude specifications; and inefficient human and manual operations. Certain prior art treatments are limited to treating crude oil with a low water cut (approximately 30% by volume), while water cut in certain emulsion layers can reach as high as about 85% for tight emulsions in heavy crude oil applications.

The oil and aqueous phases in GOSP desalters and dehydrators do not have clear boundaries. Instead, the two phases are typically separated by "rag" layers comprising brine and suspended solids emulsified with crude oil. Rag layers grow and consequently reduce the efficiency and effectiveness of the desalting and dehydrating processes in GOSP systems. To ensure good separation and to avoid contaminating the oil and water phases with contents of the rag layers, operators frequently check the interface level and manually open a recycle or drain valve to drain the rag layer (infrequently). In other circumstances, the operator increases the demulsifier injection by 25% to stabilize the operation and to meet the desired crude oil salt and water content specifications. Failure to control the rag layer can result in off-specification product in terms of salt content and BSW, because when the rag layer comes into contact with the electrical grids of the electrostatic electrodes of a dehydrator or desalter, this will cause short-circuiting and tripping of the transformers.

SUMMARY

Disclosed are systems and processes to continuously or discontinuously extract and treat, reduce, or prevent an emulsion rag layer frequently formed at oil-aqueous liquid interfaces within crude oil separation and treatment equipment, such as for example desalters, dehydrators, and wet crude oil tanks, such as low pressure degassing tanks. In some embodiments, the treatment is accomplished by continuously feeding a slip stream from an emulsion rag layer through a restricted orifice (RO) into a three-phase separation vessel or spool of pipe fitted with fully insulated electrostatic electrodes to break the emulsion. By enabling efficient control, reduction, and elimination of the rag layer in separation vessels such as for example dehydrators and desalters, the risk of transformer short-circuiting and tripping is reduced with respect to insulated electrostatic electrode grids in the vessels.

One objective is to reduce, limit, or prevent the growth of the emulsion rag layer in crude oil treatment vessels by continuously withdrawing a slip stream of the emulsion layer and treating it. Suitable insulated electrostatic electrodes are capable of handling up to 100% water cut without short circuiting, and this enhances the emulsion breaking capabilities. Limiting and treating the emulsion rag layer will avoid off-specification crude oil products and minimize demulsifier and wash water consumption. In embodiments of the disclosure, systems and methods enable the efficient control, reduction, in addition to or alternative to elimination of the rag layer. Embodiments of the disclosure can separate up to about 90% of the water content in the rag layer depending on operating temperature, crude type, electrostatic coalescers and demulsifier used, or alternatively up to about or greater than about 95% of the water content in the rag layer.

In some embodiments, targeted crude oil specifications include a salt content of not more than 10 lbs. of salt/1,000 barrels (PTB) and a BSW of not more than 0.3 volume percent. Continuously withdrawing and treating a rag layer from crude oil treatment units such as dehydrators and desalters using fully insulated electrostatic electrodes fitted inside a 3-phase separation vessel or spool of pipe includes the following advantages: processes are independent of the interface level measurement as it will limit the maximum interface level automatically by continuously withdrawing the liquid from the interface point; withdrawn liquids can be an emulsion, dry crude, or 100% water; embodiments of the systems and methods disclosed can handle 100% water, gas, or oil; embodiments of systems and methods are used to control the maximum water level inside units such as desalters and dehydrators to avoid arcing or short-circuiting and, consequently, off-specification crude oil.

In some embodiments, the level of growth of the rag layer is controlled by continuously removing the rag layer formed from a given vessel. Therefore, the interface level can be controlled without having to measure it because the layer is continuously removed. In some embodiments, the fluid is continuously withdrawn using differential pressure. Dehydrators and desalters typically operate at higher pressures than a separation vessel, such as for example a low pressure degassing tank (LPDT). The fluid inside the dehydrators and desalters can be continuously withdrawn using the differential pressure between greater pressure vessels, such as for example dehydrators, and lesser pressure vessels, such as for example a LPDT.

For example, a separation vessel operating pressure can be in the range of about 1 psig to about 10 psig, and a desalter operating pressure can be greater than about 35 psig, depending on the vapor pressure of the fluid inside the desalter. Crude oil fed to a desalter is required to be below its bubble point to ensure no free vapor is liberated in the process. Desalters are designed to be 'gas free,' since the presence of vapor in a high voltage field can cause arcing which in turn leads to more vapor formation. Desalters can operate at about 25 psig higher than the fluid vapor pressure to avoid vaporization inside the desalters and potential arcing. Ultimately, the rag layer is withdrawn using an emulsion skimmer inside the vessel.

The implementation of embodiments of systems and methods of the present disclosure will help avoid off-specification crude oil; reduce demulsifier chemical consumption and wash water consumption (lower operating cost); increase the capacity of existing desalters to de-bottleneck plant capacity; reduce the size for new desalter and dehydrators (lower capital cost); will be used to control the maximum water level inside desalters and dehydrators to avoid arcing or short-circuiting and consequently off-specification crude oil; minimize the dependency on liquid interface measurements to control the interface level; and minimize the dependency on operator to monitor the interface measurements to control the rag layer.

Embodiments described here withdraw more frequently or continuously the rag layer from GOSP units such as for example desalters and dehydrators at a controlled rate to maintain the interface level using a restricted orifice (RO) or a control valve in combination with reliable interface measurements, such as with a level indicator and controller (LIC) in addition to or alternative to a flow indicator and controller (FIC). LIC's as described herein can be used in combination with control valves in addition to or alternative to flow indicators and controllers. A rag layer stream can be fed into either or both a three phase separator vessel with fully insulated electrostatic electrodes inside to separate oil, gas, and water and a two phase vessel to aid in breaking the emulsion. In some embodiments, when the electrodes are 100% deactivated, this would indicate about 100% water cut from a slip stream intending to withdraw a rag layer, but instead only withdrawing water. Therefore, it could be used as indicator to troubleshoot/enhance the desalting process and control the water level.

The emulsion layers consists of water, oil, and solids. Subjecting the emulsion layer to high voltage electric field will result in water droplets being distorted into an elliptical shape, with positive charges accumulating at the end nearest the negative electrode of the external electric field, and negative charges at the end nearest the positive electrode. The drops become induced dipoles. Two adjacent droplets in the field will have an electrical attraction for one another. The negative end of one droplet is nearest the positive end of the neighboring droplet, so there is an attractive force between the two that tends to draw them together. This force is of sufficient magnitude to rupture the interfacial film between the droplets upon collision, and allows them to coalesce into one larger droplet. The resulting larger water droplets (globules), along with water-insoluble solids, settle to the bottom of a vessel or pipe.

Higher water levels will result in only water being withdrawn and the electrodes can be 100% de-activated. An operator, for example, can immediately respond by lowering the water level, or in other embodiments a de-activation signal from the electrodes will be used to control (open) a water level control valve to reduce the water level.

Therefore, disclosed herein is a method for treating a rag layer in a gas oil separation plant process, the method including the steps of withdrawing the rag layer from a vessel proximate an oil water interface; conveying the rag layer to a separation device, the separation device operable to effect electrostatic coalescence on the rag layer to separate oil and water; and recycling separated oil from the separation device back to the gas oil separation plant process. In some embodiments of the method, the step of withdrawing the rag layer from the vessel occurs in a vessel selected from the group consisting of: a low pressure production trap; a dehydrator; and a desalter. In certain embodiments, the separation device is selected from the group consisting of: a three-phase separation device equipped with fully insulated electrostatic electrodes and a spool of pipe equipped with fully insulated electrostatic electrodes.

In other embodiments, the step of withdrawing the rag layer from the vessel proximate an oil water interface includes withdrawing the rag layer from the vessel proximate an oily water interface skimmer. In some embodiments, the step of conveying the rag layer to a separation device includes the step of conveying the rag layer through a restricted orifice. In other embodiments, the step of withdrawing is continuous during operation of the gas oil separation plant process. Still in other embodiments, the step of withdrawing is controlled in part by a level indicator and controller in communication with the vessel and in communication with a control valve, the control valve in fluid communication with the vessel.

In certain embodiments, the method further comprises the step of discontinuing conveying the rag layer to the separation device when the separation device detects about 100% water being withdrawn from the vessel. Still other embodiments further include the step of increasing the pressure of the rag layer prior to the conveying step. And in other embodiments, the step of increasing the pressure includes the use of at least one of a turbocharger and a pump.

Additionally disclosed is a system for treating a rag layer in a gas oil separation plant process, the system including an outlet stream to withdraw the rag layer from a vessel proximate an oil water interface; a separation device, the separation device in fluid communication with the outlet stream and operable to effect electrostatic coalescence on the rag layer to separate oil and water; and a recycle line to recycle separated oil from the separation device back to the gas oil separation plant process. In some embodiments, the outlet stream is in fluid communication with at least one vessel selected from the group consisting of: a low pressure production trap; a dehydrator; and a desalter. In other embodiments, the separation device is selected from the group consisting of: a three-phase separation device equipped with fully insulated electrostatic electrodes and a spool of pipe equipped with fully insulated electrostatic electrodes.

In certain other embodiments, the vessel further comprises an oily water interface skimmer. Still in other embodiments, the outlet stream further comprises a restricted orifice. In yet other embodiments, the outlet stream effects continuous withdrawal from the vessel to the restricted orifice during the operation of the gas oil separation plant process. Still other embodiments include a level indicator and controller in communication with the vessel and in communication with a control valve, the control valve in fluid communication with the vessel via the outlet stream.

In certain embodiments, the system is operable to automatically discontinue conveying the rag layer to the separation device when the separation device detects about 100% water being withdrawn from the vessel. Still in other embodiments, a device to increase the pressure of the rag layer is included. In some embodiments, the device to increase the pressure of the rag layer is selected from the group consisting of: a turbocharger; a pump; and combinations of the same.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

FIG. 17 is a flow diagram showing an example embodiment for treatment of a rag layer from a LPDT using a recycle pump and steam injection for enhanced phase separation.

DETAILED DESCRIPTION

So that the manner in which the features and advantages of the embodiments of systems and methods of gas oil separation plants for rag layer treatment, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

For purposes of the present disclosure, tight emulsion crude oil includes emulsions that occur in medium to heavy crude oils with American Petroleum Institute (API) numbers less than about 29. Crude oil specific gravity, along with API numbers, can be used as a measure of crude oil quality. Higher API values indicate lighter oils and, thus, a higher market value. Water cut in oil production refers to the total volume of water in the crude oil stream divided by the total volume of crude oil and water, or water cut percent=total volumetric flowrate of water/(volumetric flowrate of water+ volumetric flowrate of crude oil)*100. Water cut increases with oil and gas well age during continuous production of oil and gas wells. Water cut at the beginning of the well life can be around zero percent and can reach close to 100% by the end of the life of the well. "Wet" crude oil normally has more than about 0.3 volume percent of water while "dry" crude has less than 0.3 volume percent water.

Figure 1:
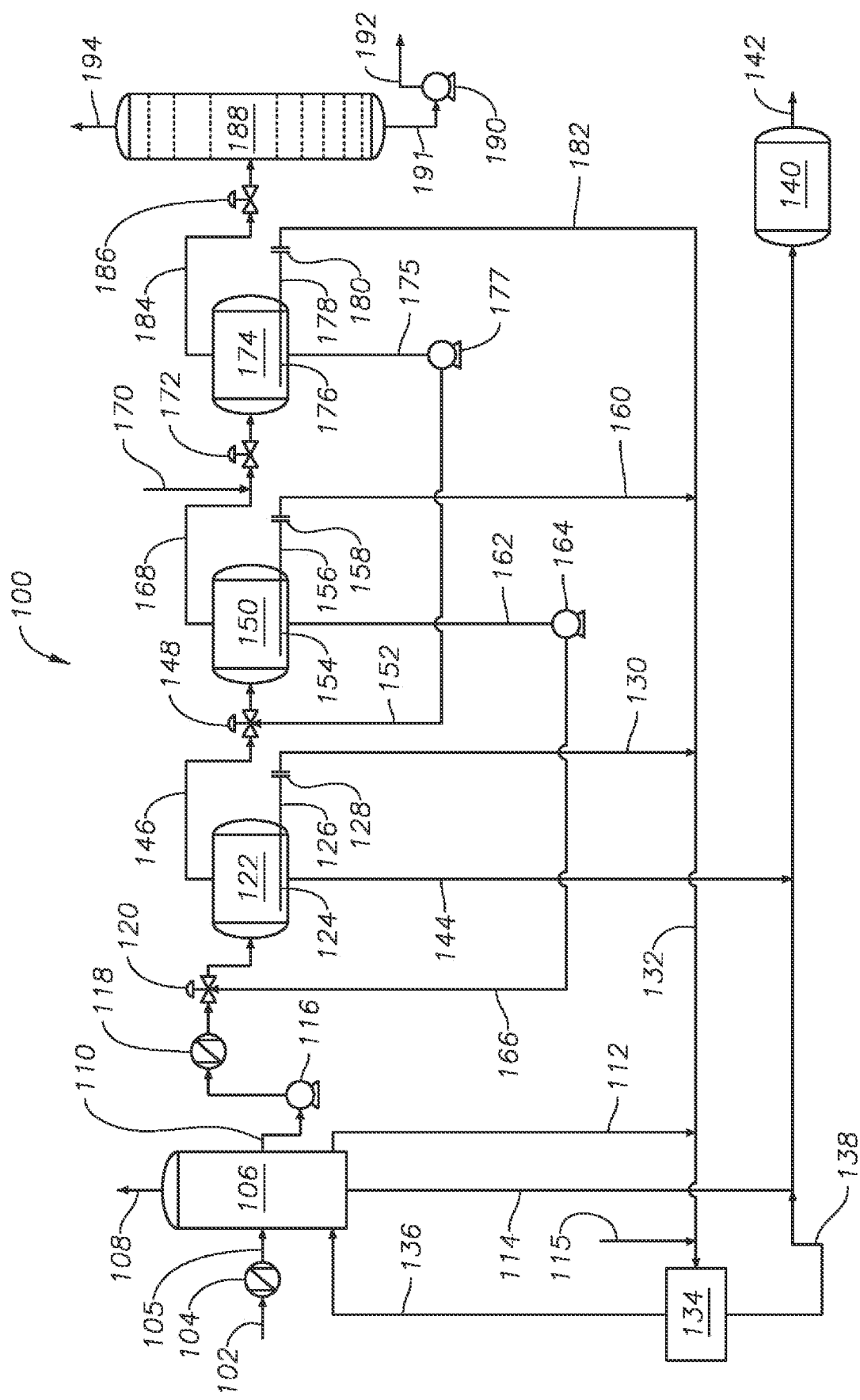
FIG. 1 is a flow diagram showing a gas oil separation plant (GOSP) applying continuous restricted orifice (RO) flow for rag layer (oil water interface) removal, along with insulated electrostatic electrodes inside a three-phase separation vessel.

Referring now to FIG. 1, a flow diagram is provided showing a gas oil separation plant (GOSP) applying continuous restricted orifice (RO) flow for rag layer (oil water interface) removal, along with insulated electrostatic electrodes inside a three-phase separation vessel. Crude oil from production traps (for example high pressure production traps (HPPT's)) enters GOSP system 100 at crude oil inlet 102 and proceeds to a wet dry crude oil heat exchanger 104 where it is heated before entering a low pressure degassing tank (LPDT) inlet stream 105 and LPDT 106. Pressure in LPDT 106 ranges from about 3 psig to about 10 psig, and LPDT 106 operating temperature ranges from about 55° F. to about 130° F. LPDT 106 outlets include off-gas stream 108 to release hydrocarbon gases, crude oil outlet stream 110, oily water outlet 112, and water outlet 114. Crude oil proceeds by crude oil outlet stream 110 to crude charge pumps 116, then to a trim heat exchanger 118, and a mixing valve 120 before entering a dehydrator 122. Dehydrator 122 includes an oily water interface skimmer 124 proximate the rag layer or interface between the oil and water within dehydrator 122. An oily water stream exits dehydrator 122 by oily water outlet stream 126 to a restricted orifice (RO) 128, and then proceeds via rag layer stream 130 to recycled rag layer stream 132. Oily water outlet 112 from LPDT 106 also joins recycled rag layer stream 132, other oil-in-water emulsion sources 115 can join recycled rag layer stream 132, and recycled rag layer stream 132 proceeds to a three-phase separation vessel with insulated electrostatic electrodes 134, to separate oil, water, and gases.

Interface skimmer location, such as for example oily water interface skimmer 124 proximate the rag layer or interface between the oil and water, can be provided by a vessel vendor, such as a dehydrator or desalter vendor, for example Baker Hughes of Houston, Tex., and the location can vary depending on the vessel type. The level of the skimmer can be adjustable in some embodiments, for example above an inlet feed, or below an inlet feed, or adjustable relative to the emulsion/rag layer. In some embodiments, electrical grids comprising electrostatic electrodes are in the oil phase within a vessel such as a desalter or dehydrator, which has lesser conductivity (greater resistance) than the aqueous phase.

An appropriate or suitable RO can be manufactured to meet the flow requirements for draining a rag layer. A RO is used instead of a standard pipe size because of the large pressure drop between a desalter or other processing vessel, such as a dehydrator, and the emulsion layer separation vessel and ultimately the LPDT. A correctly sized RO based on the differential pressure can provide the desired rag layer flow out of a processing vessel and to a separation vessel, and subsequently to a LPDT. Emulsion layer location is at the oil/water interface. A flow control valve can be used instead of an RO for increased flow control (see FIG. 2, for example). In some embodiments, an interface skimmer is fixed pipe with multiple open holes and does not move during operation of a vessel such as a desalter.

Three-phase separation vessel with insulated electrostatic electrodes 134 can have fed to it oil-in-water emulsions from a variety of sources, as shown in FIG. 1, and three-phase separation vessel with insulated electrostatic electrodes 134 separates oil and water (and optionally gas), oil being recycled by oil recycle line 136 to LPDT 106, and water being sent by water outlet stream 138 to water treatment unit 140 for eventual treated water disposal by treated water disposal line 142. Water outlet 114 from LPDT 106 and a water outlet 144 from dehydrator 122 also allow water from LPDT 106 and dehydrator 122 to proceed to water treatment unit 140 for eventual treated water disposal by treated water disposal line 142.

Insulated electrostatic electrodes can be similar to those of Wartsila Corporation of Helsinki, Finland produced under the term Vessel Internal Electrostatic Coalescers (VIEC). Another supplier of suitable electrodes would include Cameron International Corporation (a Schlumberger Company) of Houston, Tex.

Dehydrated oil from dehydrator 122 proceeds via dehydrated oil outlet stream 146 through mixing valve 148 to first stage desalter 150. At mixing valve 148, dehydrated oil outlet stream 146 is mixed with recycled wash water from recycled wash water stream 152. First stage desalter 150 includes an oily water interface skimmer 154 proximate the rag layer or interface between the oil and water within first stage desalter 150. An oily water stream exits first stage desalter 150 by oily water outlet stream 156 to a restricted orifice (RO) 158, and then proceeds via rag layer stream 160 to recycled rag layer stream 132. Recycled rag layer stream 132 proceeds to the three-phase separation vessel with insulated electrostatic electrodes 134. Water exits first stage desalter 150 by water outlet stream 162 and is recycled via pump 164 to recycled wash water line 166, where it is mixed at mixing valve 120 with crude oil from LPDT 106. Oil exits first stage desalter 150 at oil outlet stream 168 and is mixed with a wash water stream 170 (wash water stream 170 containing a lower concentration of salts than the crude oil exiting first stage desalter 150) at mixing valve 172.

Mixed oil and water enters second stage desalter 174. Second stage desalter 174 includes an oily water interface skimmer 176 proximate the rag layer or interface between the oil and water within second stage desalter 174. An oily water stream exits second stage desalter 174 by oily water outlet stream 178 to a restricted orifice (RO) 180, and then proceeds via rag layer stream 182 to recycled rag layer stream 132. Recycled rag layer stream 132 proceeds to the three-phase separation vessel with insulated electrostatic electrodes 134. Water exits second stage desalter 174 by water outlet stream 175 to pump 177 and enters mixing valve 148 by recycled wash water stream 152.

Dehydrated and desalted oil from second stage desalter 174 proceeds via oil outlet stream 184 through a depressurizing valve 186 to a crude oil stabilizer 188 for removal of volatile hydrocarbon compounds, before the stabilized, desalted, and dehydrated crude oil is pumped via crude shipping pumps 190 as a dry crude product through dry crude product stream 192. Volatile hydrocarbons exit crude oil stabilizer 188 by off-gas outlet stream 194. In the embodiment shown, crude oil stabilizer 188 does not have reboilers, but in other embodiments one or more reboilers can be applied.

In the embodiment of FIG. 1, continuous slip streams are withdrawn at the rag layer (interface between oil and water and possibly containing entrained sediment) from dehydrator 122, first stage desalter 150, and second stage desalter 174 by oily water outlet streams 126, 156, 178, respectively, through restricted orifices (RO)'s 128, 158, 180, respectively. Accurate interface level measurement is not mandatory to control the rag layer in the embodiment of FIG. 1. Restricted orifices 128, 158, and 180 are sized to allow continuous slip stream withdrawal proximate the rag layers at oily water interface skimmers 124, 154, 176, respectively, within dehydrator 122, first stage desalter 150, and second stage desalter 174, respectively.

As the rag layer is removed from vessels for treatment to break the emulsion, formation of the rag layer is reduced, limited, or eliminated. Dehydrator 122, first stage desalter 150, and second stage desalter 174 operate at greater pressures than three-phase separation vessel with insulated electrostatic electrodes 134 and LPDT 106, and therefore the pressure differential across RO's 128, 158, 180 allow for natural flow of the rag layer from the dehydrator 122, first stage desalter 150, and second stage desalter 174 via continuous slip streams toward and into the three-phase separation vessel with insulated electrostatic electrodes 134 and LPDT 106. Once again, three-phase separation vessel with insulated electrostatic electrodes 134 helps break the emulsion of the rag layer via electrostatic coalescence.

Continuously withdrawing the rag layer prevents its growth and consequently controls the interface. In some embodiments, if the water level in vessels 122, 150, 174 rises and about 100% water was flowing to three-phase separation vessel with insulated electrostatic electrodes 134, the electrodes can be 100% deactivated if such a high concentration of water is detected or sensed.

In other embodiments, a flow control valve can be used instead of a RO for improved flow control. A flowmeter can be provided upstream of a control valve and receive its set point from the de-activation signals from the electrodes to stop flow of a slip stream from the rag layer level. A deactivation signal from the electrodes also can be used to control (open) a water level control valve to reduce the water level in a vessel to below an oily water interface skimmer, such that an oily water interface is proximate an oily water interface skimmer. In some embodiments, a flow control valve will set to continuously withdraw the rag layer at a laboratory estimated flow after conducting an emulsion test. This flow can increase gradually when all electrodes are not de-activated. In some embodiments, an oily water interface skimmer is a fixed pipe installed in the emulsion layer with a plurality of open holes to withdraw the rag layer across a vessel.

Figure 5:
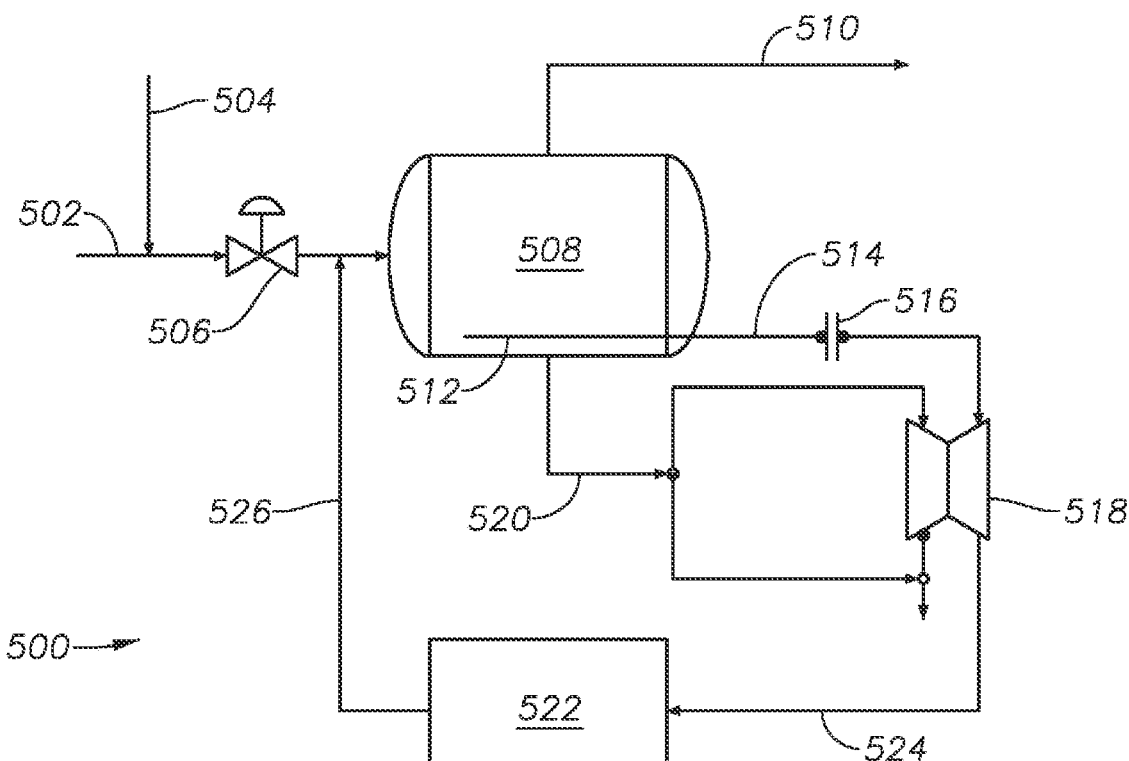
FIG. 5 is a flow diagram showing an example embodiment for treatment of a rag layer from a desalter using a turbocharger.
Figure 6:
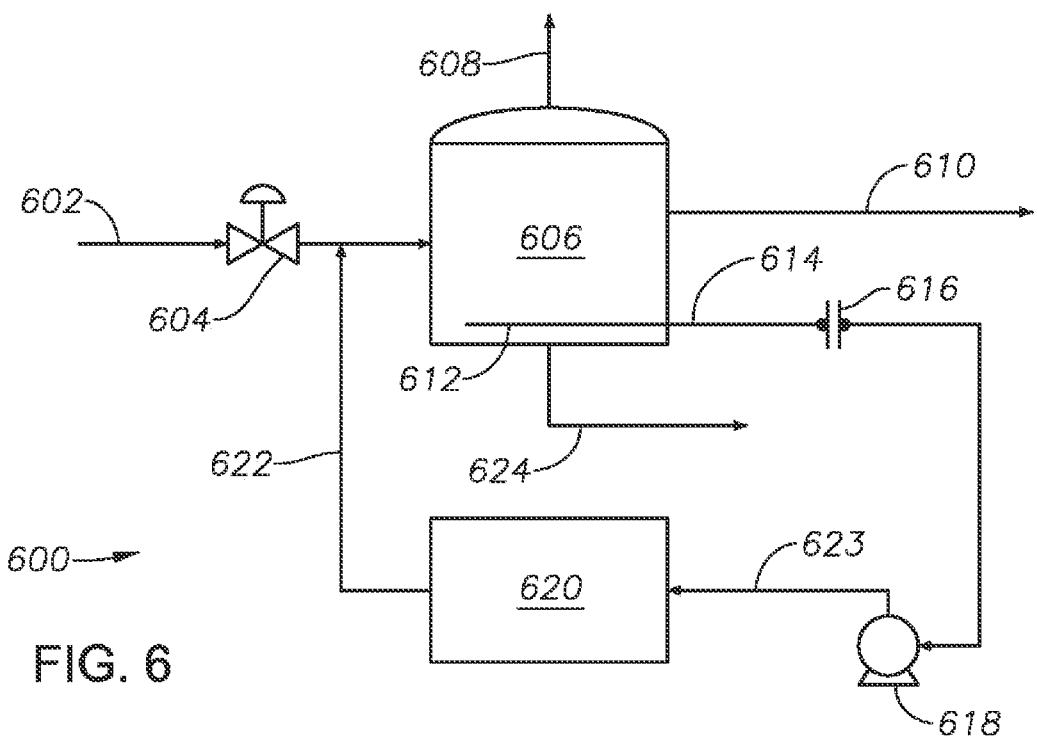
FIG. 6 is a flow diagram showing an example embodiment for treatment of a rag layer from a LPDT using a recycle pump.

In three-phase separation vessel with insulated electrostatic electrodes 134, insulated electrostatic electrodes are capable of handling up to 100% water cut, and the electrodes can be fully deactivated at about 100% water cut, which means only water is being withdrawn from dehydrator 122, first stage desalter 150, and second stage desalter 174, rather than a desired rag layer, or oil-in-water emulsion layer. While the embodiment of FIG. 1 shows oil from three-phase separation vessel with insulated electrostatic electrodes 134 being reintroduced to LPDT 106 by oil recycle line 136, oil could be reintroduced at other points, such as for example to dehydrator 122, first stage desalter 150, or second stage desalter 174, optionally with the use of a turbocharger in addition to or alternative to a recycle pump, as shown in FIGS. 5-6 and described as follows.

Figure 2:
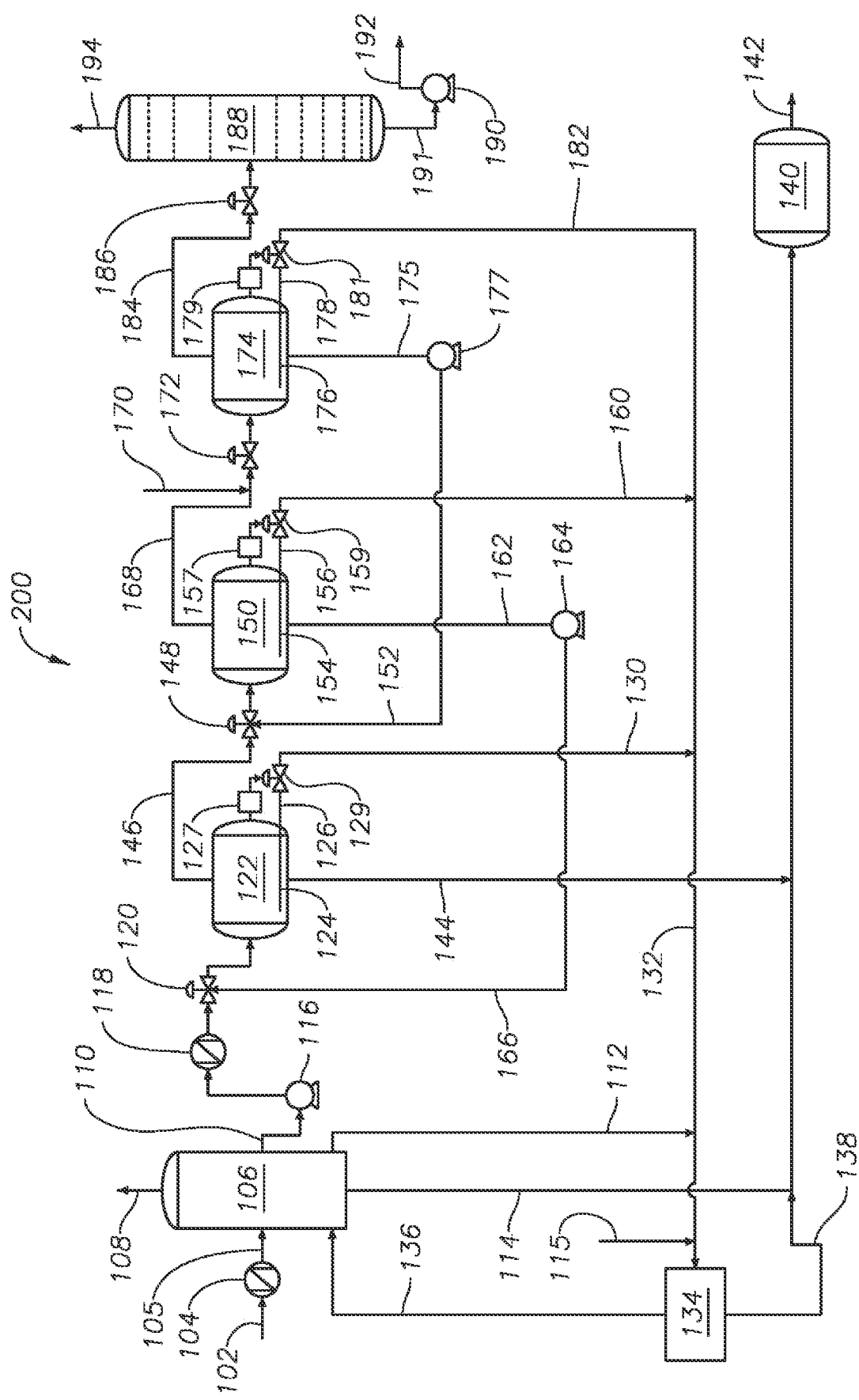
FIG. 2 is a flow diagram showing a GOSP applying controlled, continuous or discontinuous, automatic interface level control flow for rag layer removal, along with insulated electrostatic electrodes inside a three-phase separation vessel.

Referring now to FIG. 2, a flow diagram is provided showing a GOSP applying continuous, or discontinuous, automatic interface level control flow for rag layer (oil water interface) removal, along with insulated electrostatic electrodes inside a three-phase separation vessel. Units labeled similarly to FIG. 1 are the same or similar units. As shown in FIG. 2, instead of restricted orifices (RO)'s 128, 158, 180 from FIG. 1, in FIG. 2 GOSP system 200 dehydrator 122 includes a level indicator and controller (LIC) 127 to control a control valve 129, first stage desalter 150 includes LIC 157 to control a control valve 159, and second stage desalter 174 includes LIC 179 to control a control valve 181. LIC's 127, 157, 179 can be used alternative to or in addition to flow indicators and controllers (FIC's). In dehydrator 122, first stage desalter 150, and second stage desalter 174, rag layers or the layer between oil and water in the vessels is withdrawn in a continuous, or discontinuous, manner under automatic interface level control instead of restricted flow as show in FIG. 1.

In three-phase separation vessel with insulated electrostatic electrodes 134, insulated electrostatic electrodes are capable of handling up to 100% water cut, and the electrodes can be fully deactivated at sensing or detecting 100% water cut, which means only water is being withdrawn from dehydrator 122, first stage desalter 150, and second stage desalter 174, rather than the desired rag layer, or oil in water emulsion layer. By testing, detecting, or sensing if the flow through three-phase separation vessel with insulated electrostatic electrodes 134 is about 100% water, operators or program logic can readjust, limit, increase, or change the location of the slip stream withdrawal from separation vessels such as dehydrator 122, first stage desalter 150, and second stage desalter 174. For example, if about 100% water was detected passing through three-phase separation vessel with insulated electrostatic electrodes 134, control valves 129, 159, 181 could be deactivated, or flow could be reduced but continued to avoid or reduce the formation of a rag layer in vessels 122, 150, 174.

Figure 3:
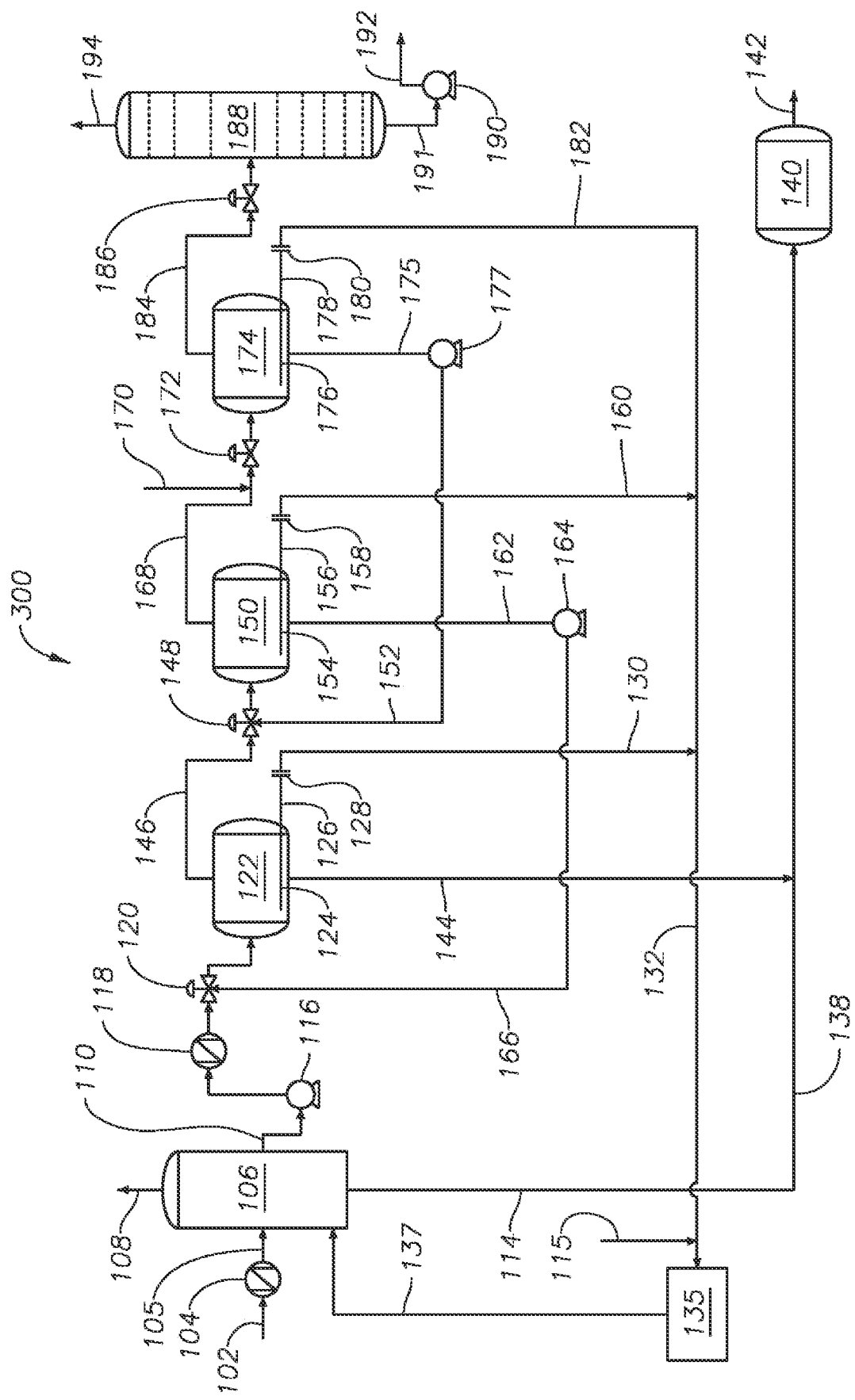
FIG. 3 is a flow diagram showing a GOSP applying continuous RO flow for rag layer removal, along with insulated electrostatic electrodes inside a spool of pipe.

FIG. 3 is a flow diagram showing a gas oil separation plant (GOSP) applying continuous restricted orifice (RO) flow for rag layer (oil water interface) removal, along with insulated electrostatic electrodes inside a spool of pipe. Units numbered similarly to FIGS. 1 and 2 are the same or similar units. Similar to FIG. 1, in FIG. 3 GOSP system 300 uses RO's 128, 158, 180 in dehydrator 122, first stage desalter 150, and second stage desalter 174, respectively, to remove a continuous slip stream of the rag layer in the vessels proximate the oily water interface skimmers 124, 154, 176. Rather than a three-phase separator such as three-phase separation vessel with insulated electrostatic electrodes 134 shown in FIGS. 1 and 2, FIG. 3 includes a spool of pipe fitted with insulated electrostatic electrodes 135, and the whole treated rag layer is sent back to the LPDT 106 via stream 137. In other embodiments, a spool of pipe fitted with insulated electrostatic electrodes can be disposed in other locations of a GOSP system, such as for example GOSP system 300, and in other embodiments a spool of pipe fitted with insulated electrostatic electrodes can be used in addition to a three-phase separator (preceding or following), such as for example three-phase separation vessel with insulated electrostatic electrodes 134 shown in FIGS. 1 and 2.

In spool of pipe fitted with insulated electrostatic electrodes 135, when there is 100% water cut, the electrodes can be set to be 100% deactivated, as the layers being withdrawn from dehydrator 122, first stage desalter 150, and second stage desalter 174 are substantially all water, and do not include an oily water emulsion for treatment.

Regarding the difference between a three-phase separation vessel with insulated electrostatic electrodes versus a spool of pipe fitted with insulated electrostatic electrodes, a three phase separator will have a feed inlet, an oil outlet, a water outlet, and a gas outlet. The vessel will contain gas, and an oil-water emulsion. In a three phase vessel fitted with insulated electrostatic electrodes, the electrode elements will break the emulsion into crude oil and free water. The vessel is designed to provide enough residence time to separate the free water from the crude, for example between about 3 to about 5 minutes. Crude, and optionally gas, is then returned to a separation vessel, such as for example LPDT 106 shown in FIGS. 1 and 2.

However in a spool of pipe fitted with insulated electrostatic electrodes, the electrode elements will break the emulsion into free water and crude, but there is not complete physical separation inside the pipe of oil from water, as the residence time is less than that of a three-phase separation vessel, for example less than about 3 minutes. Instead, the separation of the water and crude after the spool of pipe fitted with insulated electrostatic electrodes will be completed in the downstream LPDT or any other downstream separation vessels.

Using a spool of pipe can be simpler, cheaper, and require less space. Free water will be separated in downstream equipment, such as for example a LPDT. In some embodiments, a flow rate through a spool of pipe fitted with insulated electrostatic electrodes is variable depending on emulsion breaking tests. Temperature can range from about 100° F. to about 312° F. for both a three-phase separation vessel with insulated electrostatic electrodes and a spool of pipe fitted with insulated electrostatic electrodes. Pressure will range from about 1 psig to about 15 psig for the three-phase separator, and for the spool of pipe pressure is above the bubble point pressure of the fluid for the spool pipe to prevent vaporization. For example, above about 100 psig or about 10 psig higher than the bubble point of the fluid in the spool of pipe.

Figure 4:
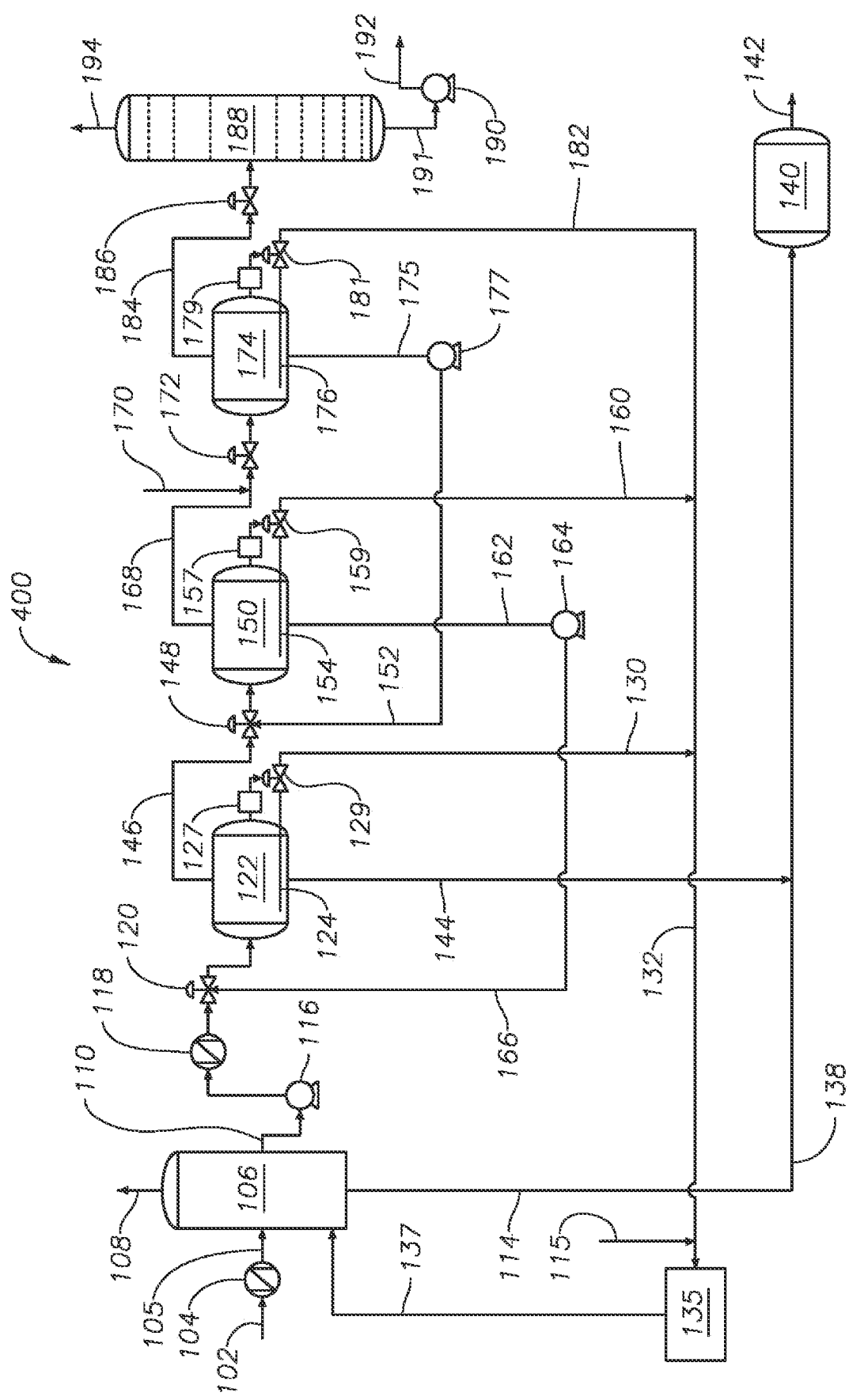
FIG. 4 is a flow diagram showing a GOSP applying controlled, continuous or discontinuous automatic interface level control flow for rag layer removal, along with insulated electrostatic electrodes inside a spool of pipe.

Referring now to FIG. 4, a flow diagram is provided showing a gas oil separation plant (GOSP) applying continuous, or discontinuous, automatic interface level control flow for rag layer (oil water interface) removal, along with insulated electrostatic electrodes inside a spool of pipe. Similar to FIG. 2, in FIG. 4 GOSP system 400 uses LIC's 127, 157, 179 and control valves 129, 159, 181 with dehydrator 122, first stage desalter 150, and second stage desalter 174, respectively, to remove an automated, continuous, or discontinuous, slip stream of the rag layer in the vessels proximate the oily water interface skimmers 124, 154, 176. LIC's 127, 157, 179 can be used in addition to or alternative to flow indicators and controllers (FIC's).

Rather than a three-phase separator such as three-phase separation vessel with insulated electrostatic electrodes 134 shown in FIG. 2, FIG. 4 includes a spool of pipe fitted with insulated electrostatic electrodes 135, and the entire treated rag layer is sent back to the LPDT 106 via stream 137. In other embodiments, a spool of pipe fitted with insulated electrostatic electrodes can be disposed in other locations of a GOSP system, such as for example GOSP system 400, and in other embodiments a spool of pipe fitted with insulated electrostatic electrodes can be used in addition to a three-phase separator (preceding or following), such as for example three-phase separation vessel with insulated electrostatic electrodes 134 shown in FIG. 2.

In spool of pipe fitted with insulated electrostatic electrodes 135, when there is 100% water cut, the electrodes are set to be 100% deactivated, as the layers being withdrawn from dehydrator 122, first stage desalter 150, and second stage desalter 174 are all water, and do not include an oily water emulsion for treatment.

In embodiments of systems and methods of the present disclosure, one or more high pressure production traps (HPPT's) can precede LPDT's, and pressure in a HPPT can range from about 150 psig to about 450 psig depending on the crude oil supply pressure. Typically, wash water salinity ranges from about 100 ppm to about 12,000 ppm salt in embodiments of the present disclosure, for example in wash water stream 170. Wash water will be more effective at lower salinity. Formation water salinity inside crude oil can reach as high as 270,000 ppm of salt content. Demulsifiers, or emulsion breakers, are chemicals used to separate emulsions (for example oil-in-water emulsions). Some commercially available demulsifiers are Petrolite DMO-22241 by Baker Petrolite, Emulsotron CC-8948 by Champion Technologies, SUGEST 9005 by German Metal Surface Treatment Chemical Co., Clariant Phasetreat 4688 by Clariant, or any other suitable demulsifier.

Proper identification and design of the interface layer is advantageous for the successful application of embodiments of the disclosure. In some embodiments, a rag layer is withdrawn based on the pressure differential available between the desalters/dehydrators and the LPDT. Inlet pressure to a RO or LIC/control valve at a dehydrator or desalter can be more than about 150 psig, while the downstream pressure is less than about 15 psig, for example at a LPDT. In this example, there is more than about 135 psig differential pressure to control the flow throw a RO or LIC/control valve combination. A RO will be sized based on the pressure drop available and the flow rate range required for a slip stream of the rag layer. For the LIC/control valve combination, a flow controller to control the flow can be included. For instance, if insulated electrostatic electrodes sensed or detected about 100% water withdrawal, flow from an oily water interface layer could be stopped, and the water level in a dehydrator or desalter could be lowered by releasing more water from the vessel.

Referring now generally to FIGS. 1-4, wet crude oil from oil production wells enters production separators (also referred to as production traps) preceding a wet dry heat exchanger, such as wet dry crude oil heat exchanger 104, and the wet crude oil undergoes an initial three-phase water, oil, gas separation to remove most of the gasses and free-formation water. The operating conditions in the production separators ranges from about 65° F. to about 130° F. and about 50 psig to about 450 psig.

The initially-treated wet crude oil stream from the production separators is passed to a wet dry crude heat exchanger, such as wet dry crude oil heat exchanger 104, to recover heat from a stabilizer product bottom stream, such as for example dry crude product bottom stream 191 shown in FIG. 1, and to reheat the oil/water/gas mixture to above 85° F. to enhance water separation in a LPDT, for example LPDT 106. Heated crude oil from wet dry crude oil heat exchanger 104 is passed to the three-phase separator LPDT 106 where pressure is reduced to about 3 psig, so that the last heavy gas components can boil out and be removed via off-gas stream 108. Operating conditions in LPDT's range from about 65° F. to about 130° F. and about 3 psig to about 5 psig.

Wet crude oil in crude oil outlet stream 110 from LPDT 106 is pumped through crude charge pumps 116 and is conveyed to a trim heat exchanger 118 to increase the temperature of the crude oil to above 150° F., and then crude oil is passed to dehydrator 122 for further water/oil separation. Heating wet crude oil enhances the efficiency of dehydrator 122 and increases desalting efficiency of first stage desalter 150 and second stage desalter 174. Heat exchangers can be a tube/shell type where wet crude oil passes though tubes and the heating medium is placed inside an outer shell.

Heated crude oil from the trim heat exchanger 118 is passed to mixing valve 120 to mix in recycle wash water from recycled wash water line 166 from first stage desalter 150 before entering dehydrator 122. Mixing valve differential pressure ranges from about 10 psig to about 30 psig. Dehydrator 122 is a horizontal vessel where a certain amount of drying the wet crude oil occurs. Washing and electrostatic coalescence takes place in dehydrator 122. The wet crude oil input to dehydrator 122 still contains some free salty water, and salty water in the form of an emulsion in the oil. The emulsion is separated into layers of oil and water by electrostatic coalescence. Electrostatic coalescence uses an electric current, causing the water droplets in the emulsion to collide, coalesce into larger (heavier) drops, and settle out of the crude oil. This process partially dries the wet crude oil. Oily water proceeds to water treatment unit 140 by water outlet 144. Partially-dried crude oil, still containing some salty water in emulsion, goes to the first stage desalter 150. The operating temperature of the dehydrator ranges from about 130° F. to about 160° F., and the pressure in dehydrator 122 is about 25 psig above the crude oil vapor pressure.

In dehydrator 122, an emulsion layer (rag layer) is formed between liquid oil and water, due several factors including the naturally occurring emulsifying agents in the crude oil, total suspended solids in crude or formation water, low operating and low seasonal crude arrival temperature, and the type of demulsifier used. Conventionally, the control of the rag layer is performed manually by increasing the demulsifier injection dosage and opening skimming valves. However, due to a lack of reliable interface level measurement, operators have needed to visually determine if the withdrawn phase is oil or water or if it is a stable emulsion phase (rag layer). In embodiments of systems and methods here, a RO can be sized based on the pressure drop available from a high pressure vessel to a low pressure vessel, and the flow rate range desired for withdrawal from a rag layer via a slip stream. For a LIC/control valve combination, optionally in addition to or alternative to a flow indicator and controller, flow can increase when a rag layer is detected (insulated electrostatic electrodes not sensing/detecting about 100% water), and a flow controller can decrease or stop flow withdrawal from a rag layer if about 100% water is detected at insulated electrostatic electrodes.

Partially-dried crude oil from dehydrator 122 is mixed with recycled effluent water from recycled wash water stream 152 from the second stage desalter 174 in mixing valve 148. Effluent water from first stage desalter 150 is conveyed to dehydrator 122. The operating temperature of the first stage desalter ranges from about 130° F. to about 160° F., and the pressure is to be about 25 psig above the crude oil vapor pressure.

In first stage desalter 150, an emulsion layer (rag layer) is formed between liquid oil and water, due several factors including the naturally occurring emulsifying agents in the crude, total suspended solids in crude or formation water, low operating and low seasonal crude arrival temperature, and the type of demulsifier used. Conventionally, control of the rag layer is performed manually by increasing the demulsifier injection dosage and opening skimming valves. Due to the lack of reliable interface level measurement, operators have needed to visually determine if the withdrawn phase is oil or water or if it is a stable emulsion phase (rag layer).

Second stage desalter 174 can be one of the final stages of wet crude oil processing in a GOSP. Partially dried crude oil is conveyed to second stage desalter 174 from first stage desalter 150. Fresh wash water (lower in salt concentration than the crude oil) is injected into the inlet of the second stage desalter mixing valve 172. Low salinity wash water rinses remaining salt from the crude oil. Fresh wash water is used in the desalter process to ensure that the maximum amount of salt is rinsed from the wet crude oil. Electrostatic coalescence removes the remaining water emulsion from the wet crude oil in the same way as the dehydrator 122 and first stage desalter 150. Effluent water from second stage desalter 174 is conveyed to the first stage desalter 150. The output from second stage desalter 174 is dry crude oil that passes to the depressurizing valve 186 and then to the crude oil stabilizer 188. The operating temperature of the second stage desalter ranges from about 130° F. to about 160° F., and the operating pressure is at least about 25 psig above the crude oil vapor pressure.

In second stage desalter 174, an emulsion layer (rag layer) is formed between liquid oil and water, due several factors including the naturally occurring emulsifying agents in the crude, total suspended solids in crude or formation water, low operating and low seasonal crude arrival temperature, and the type of demulsifier used. Conventionally, control of the rag layer has been performed manually by increasing demulsifier injection dosage and by opening skimming valves. Due to the lack of reliable interface level measurement, operators have visually determined in the past if the withdrawn phase is oil or water or if it is stable emulsion phase (rag layer).

Water treatment unit 140 collects water from streams from dehydrators, LPDT's, LPPT's, and any HPPT's, and separates oil from the collected water. Wastewater is discharged to disposal water wells and extracted oil is conveyed to the LPDT, such as LPDT 106.

Referring now to FIG. 5, a flow diagram is provided showing an example embodiment for treatment of a rag layer from a desalter. In system 500, crude oil inlet stream 502 is mixed with fresh water from fresh water stream 504 in mixing valve 506, before entering a desalter 508. Treated crude oil exits desalter 508 by stream 510, and proximate an oily water interface skimmer 512, a rag layer stream 514 is withdrawn through RO 516 to a turbocharger 518. Water stream 520 from the bottom of desalter 508 is also conveyed to turbocharger 518. Turbocharger 518 is used to boost the pressure of the emulsion slip stream (recycled rag layer or oily water emulsion) before being fed to a spool of pipe fitted with fully insulated electrostatic electrodes 522. The electrodes can be programmed to be 100% deactivated when the incoming stream 524 is 100% water. The treated rag layer from the pipe fitted with fully insulated electrostatic electrodes 522 is recycled via stream 526 back to desalter 508 to be mixed with crude oil.

For the embodiment of FIG. 5, this is one method to apply in refineries in which there is no low pressure storage tank(s) available prior to the desalters, for example. A turbocharger is installed to restore the energy (pressure) to the water stream 520 and to boost the rag layer stream 514 for recycling it back to the desalter 508 inlet at higher pressure.

Notably, the layout of the turbocharger treatment shown in FIG. 5 could be applied in a variety of configurations to the dehydrators, in addition to or alternative to the desalters shown in FIGS. 1-4 and explained previously.

Referring now to FIG. 6, a flow diagram is provided showing an example embodiment for treatment of a rag layer from a LPDT. In system 600, crude oil inlet stream 602 proceeds through valve 604 before entering LPDT 606. Hydrocarbon gases exit LPDT by off-gas stream 608, and treated crude oil proceeds to desalters via outlet stream 610. An oily water interface skimmer 612 allows a recycled rag layer (oily water emulsion) 614 to proceed out of LPDT 606 and through RO 616, after which it is recycled by recycle pump 618 to a pipe fitted with fully insulated electrostatic electrodes 620. Treated oily water emulsion (rag layer) returns to LPDT 606 by recycle stream 622. Oily water exits the bottom of LPDT 606 by stream 624.

The electrodes can be programmed to be 100% deactivated when the incoming stream 623 is 100% water. The treated rag layer from the pipe fitted with fully insulated electrostatic electrodes 620 is recycled via stream 622 back to LPDT 606 to be mixed with crude oil. The embodiment of FIG. 6 shows one system and method for breaking an emulsion in about atmospheric pressure wet crude oil storage tanks. A RO can be used to control the flow, in addition to or alternative to a LIC/FIC/control valve combination. One objective of the pressure boosting in FIGS. 5 and 6 is to provide enough head to recycle the flow back to the tank inlets for recycle.

Notably, the layout of the LPDT shown in FIG. 6 could be applied in a variety of configurations to the LPDT's shown in FIGS. 1-4 and explained previously.

Proper design of the interface layer location and the electrostatic grids in the conventional desalters are advantageous for the successful application of the invention. Manually recycling a rag layer to an LPDT succeeds in the short term, but the rag layer is being recirculated and will eventually accumulate again and cause operation interruption. Treating the rag layer will permanently resolve the emulsion issue, such as disclosed herein with insulated electrostatic electrodes.

Figure 7:
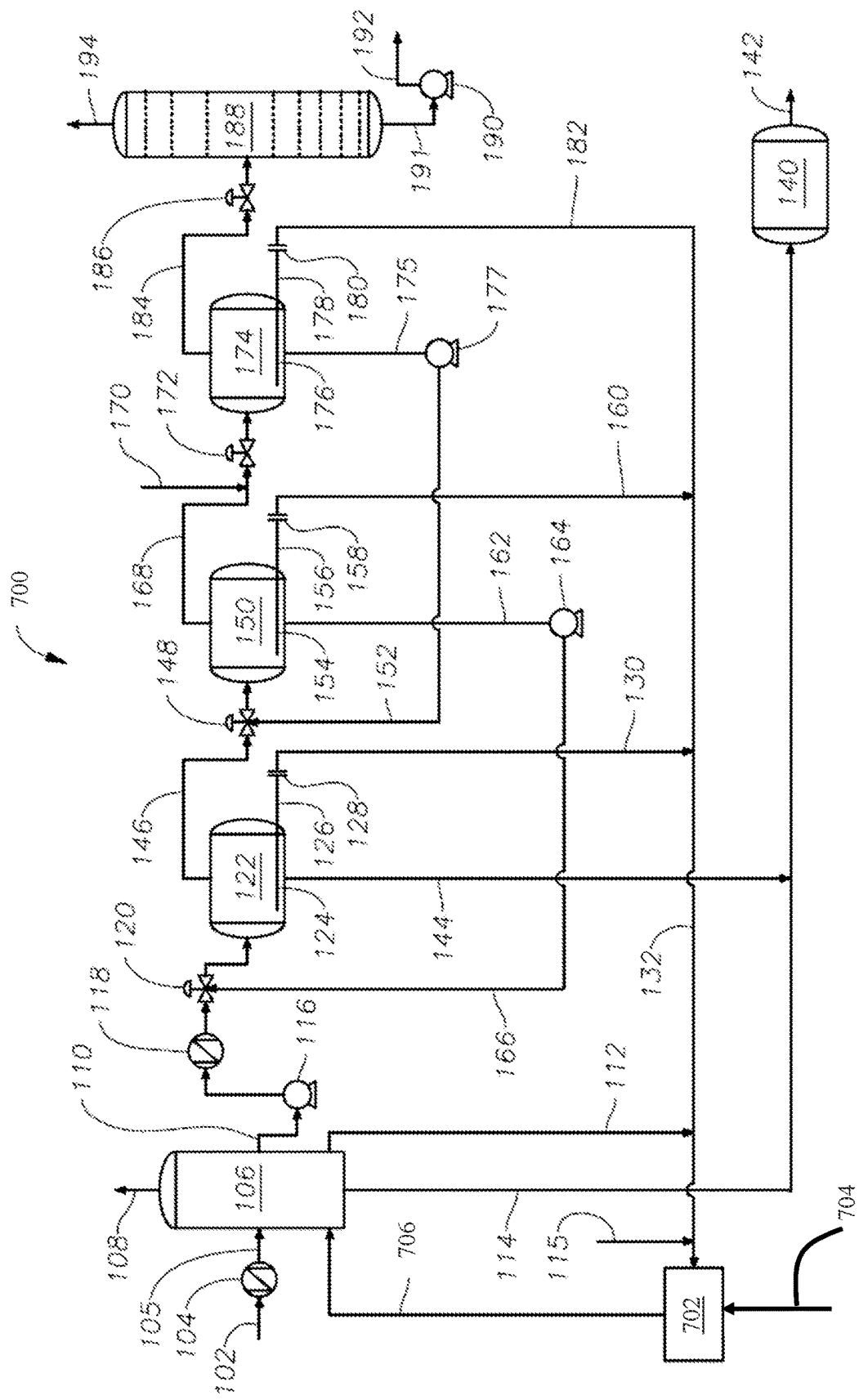
FIG. 7 is a flow diagram showing a GOSP applying continuous RO flow for rag layer removal, along with steam injection for enhanced phase separation.

In the embodiments of FIGS. 7-17, similarly labeled units and flow paths are the same or similar to those shown in and described for earlier FIGS. 1-6. Where different operating conditions are not described, the operating conditions of FIGS. 7-17 are similar to those described for FIGS. 1-6. FIG. 7 is a flow diagram showing a GOSP applying continuous RO flow for rag layer removal, along with steam injection for enhanced phase separation. In the embodiment of FIG. 7, instead of three-phase separation vessel with insulated electrostatic electrodes 134, a mixing unit 702 is shown with steam injection stream 704. Accurate interface level measurement is not mandatory to control the rag layer in the embodiment of FIG. 7. Restricted orifices 128, 158, and 180 are sized to allow continuous slip stream withdrawal proximate the rag layers at oily water interface skimmers 124, 154, 176, respectively, within dehydrator 122, first stage desalter 150, and second stage desalter 174, respectively.

Recycled rag layer stream 132, optionally along with other oil-in-water emulsion sources 115, proceeds to mixing unit 702 for mixing with steam from steam injection stream 704. Mixing unit 702 can include one or more steam injection nozzles to mix recycled rag layer stream 132 with low or high pressure steam, for example available at a temperature of about 300° F., or about between 250° F. and 350° F., and a pressure of about 50 psig or more. Steam injection can heat and break an oil-in-water emulsion in an emulsion rag layer. Heating a rag layer lessens its viscosity and consequently increases the water droplet coalescing and settling rate. This results in advantageously improved water separation downstream of mixing unit 702 in LPDT 106, with water to be removed from the process via water outlet 114. A steam treated emulsion layer stream can be sent back to the LPDT 106 via oil-water stream 706 at between about 3 psig to about 10 psig, or it can be returned to the inlet of a desalting/dehydrating process via a pump, described further with regard to FIG. 9.

In some embodiments applying a mixing unit, such as mixing unit 702, and a steam injection stream, such as steam injection stream 704, external steam modulation can be applied with a steam control valve external to the mixing unit to control the partial pressure of the steam applied to the rag layer in the mixing unit. External modulation uses a steam control valve on the supply line to vary the pressure of the steam at the point of injection. Varying the pressure changes the steam density and velocity through the nozzle of a fixed size to control the amount of heating.

Advantageously, however, in other embodiments direct steam injection (DSI) can be used in addition to or alternative to external steam modulation. For example, hydroheaters and jetcookers can control steam flow and mixing turbulence by employing a modulating stem plug and nozzle assembly inside the heaters. Internally modulated DSI controls the injection area, rather than steam velocity and density, to regulate the amount of heating in a mixing unit such as mixing unit 702. An internally modulated heater can operate at higher steam velocities compared to external modulation. Higher velocity produces improved, often rapid mixing and nearly instantaneous condensation of the steam into the process fluid, such as a rag layer.

One advantage includes that mixing of metered amounts of high-velocity steam directly with a liquid or slurry, such as a rag layer, provides instantaneous transfer of heat from steam to the liquid. Variable-area steam nozzles meter the flow at the point of injection and contact with the fluid. A large pressure drop from full steam pressure to the process fluid pressure ensures high-velocity choked steam flow and instantaneous mixing of the two streams. When steam flow is choked, its velocity at the nozzle exit is constant regardless of the total mass flow injected. Constant steam velocity therefore results in consistent and stable operation across a variable range of operations.

For example, a steam injection heater with choked flow design can deliver sonic velocity steam injection and control the mass flow of steam through a variable area steam injector to ensure rapid mixing and condensation of the steam. Choked flow is the phenomenon of accelerating a vapor to maximum velocity by creating a pressure differential through an engineered opening. By establishing choked flow, the steam mass flow is metered to control the heating of a liquid, such as a rag layer. This produces predictable results based on position of the stem plug. Through a variable-area steam diffuser, steam flow is metered at the point where steam and liquid first contact and mix. Suitable DSI units and systems are available, for example, from Hydro-Thermal of Waukesha, Wis. and from the I-Series Inline product line of Pro-Sonix of Milwaukee, Wis.

Unlike indirect surface-contact heat exchangers, DSI does not have a heat transfer barrier in the form of a wall separating the steam and the material to be heated. As noted an instantaneous transfer of heat energy is an advantage of DSI, as it provides precise temperature control and energy efficiency. More than 20% of steam's energy can be present as sensible heat. A DSI heater requires less steam flow for a given process than surface-contact heat exchangers, because it utilizes both the latent and specific heat of steam. Condensate return is not required, because substantially all of the steam's energy is transferred to the process.

DSI heaters are an advantageous option for hard-to-heat fluids, such as slurries, rag layers, or highly viscous fluids that tend to clog heat exchangers, and for fluids that require nearly instantaneous heating. DSI heaters are internally modulated through a stem-plug assembly inside the heater, and changing the steam discharge area of the nozzle varies the amount of steam passing through the nozzle, and maintains good mixing characteristics. Internal modulation can eliminate the need for an external steam control valve.

Certain nozzle area designs for DSI can ensure constant steam pressure and velocity at the point of contact with a rag layer, eliminating potential for pressure upsets and ensuring smooth heater/mixer operation. Application of DSI is advantageous for processes where a process fluid to be heated is partially water miscible. Properties of the process fluid considered include its specific heat, density, and viscosity, and considering such properties of a rag layer allow for application of an appropriate amount of steam to be applied for separation of the oil and aqueous phases.

Figure 8:
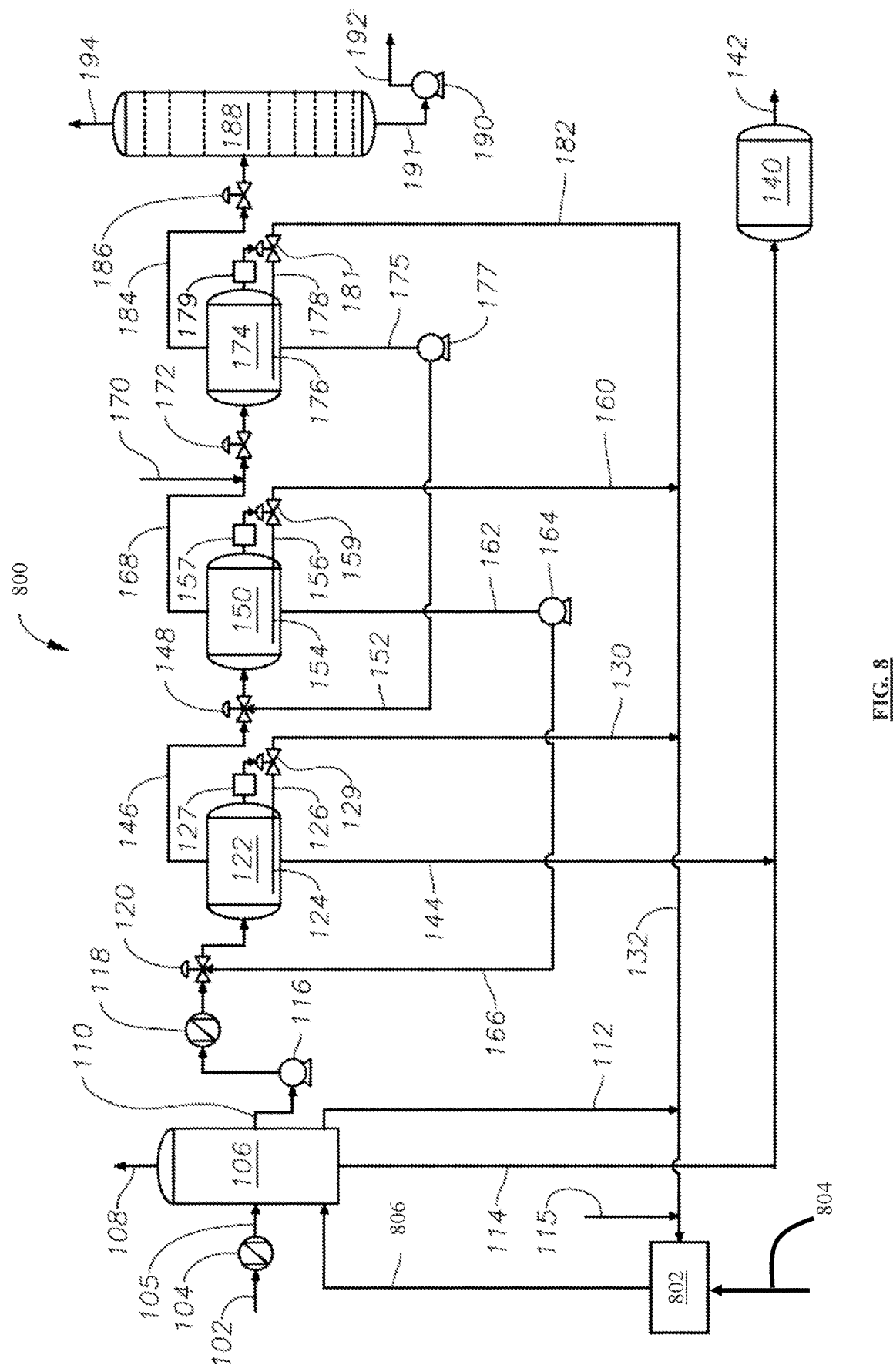
FIG. 8 is a flow diagram showing a GOSP applying controlled, continuous or discontinuous, automatic interface level control flow for rag layer removal, along with steam injection for enhanced phase separation.

FIG. 8 is a flow diagram showing a GOSP applying controlled, continuous or discontinuous, automatic interface level control flow for rag layer removal, along with steam injection for enhanced phase separation. In FIG. 8 GOSP system 800 uses LIC's 127, 157, 179 and control valves 129, 159, 181 with dehydrator 122, first stage desalter 150, and second stage desalter 174, respectively, to remove an automated, continuous, or discontinuous, slip stream of the rag layer in the vessels proximate the oily water interface skimmers 124, 154, 176. LIC's 127, 157, 179 can be used in addition to or alternative to flow indicators and controllers (FIC's). In the embodiment of FIG. 8, instead of three-phase separation vessel with insulated electrostatic electrodes 134, a mixing unit 802 is shown with steam injection stream 804.

Recycled rag layer stream 132, optionally along with other oil-in-water emulsion sources 115, proceeds to mixing unit 802 for mixing with steam from steam injection stream 804. Mixing unit 802 can include one or more steam injection nozzles to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. This results in advantageously improved water separation downstream of mixing unit 802 in LPDT 106, with water to be removed from the process via water outlet 114. A steam treated emulsion layer stream can be sent back to the LPDT 106 via oil-water stream 806 at between about 3 psig to about 10 psig, or it can be returned to the inlet of a desalting/dehydrating process via a pump, described further with regard to FIG. 9.

In various embodiments described here, low pressure steam can be at about 50 psig up to about 100 psig or up to about 150 psig, and high pressure steam is at about 150 psig and greater. A suitable amount of steam can be calculated based on the following factors: rag layer/emulsion flow rate, rag layer/emulsion specific heat, desired temperature increase in the rag layer, and steam latent heat. Similar to the embodiment of FIG. 7, the embodiment of FIG. 8 can apply external steam modulation in addition to or alternative to DSI, and the embodiments described as follows can similarly apply either or both of external steam modulation and DSI.

Figure 9:
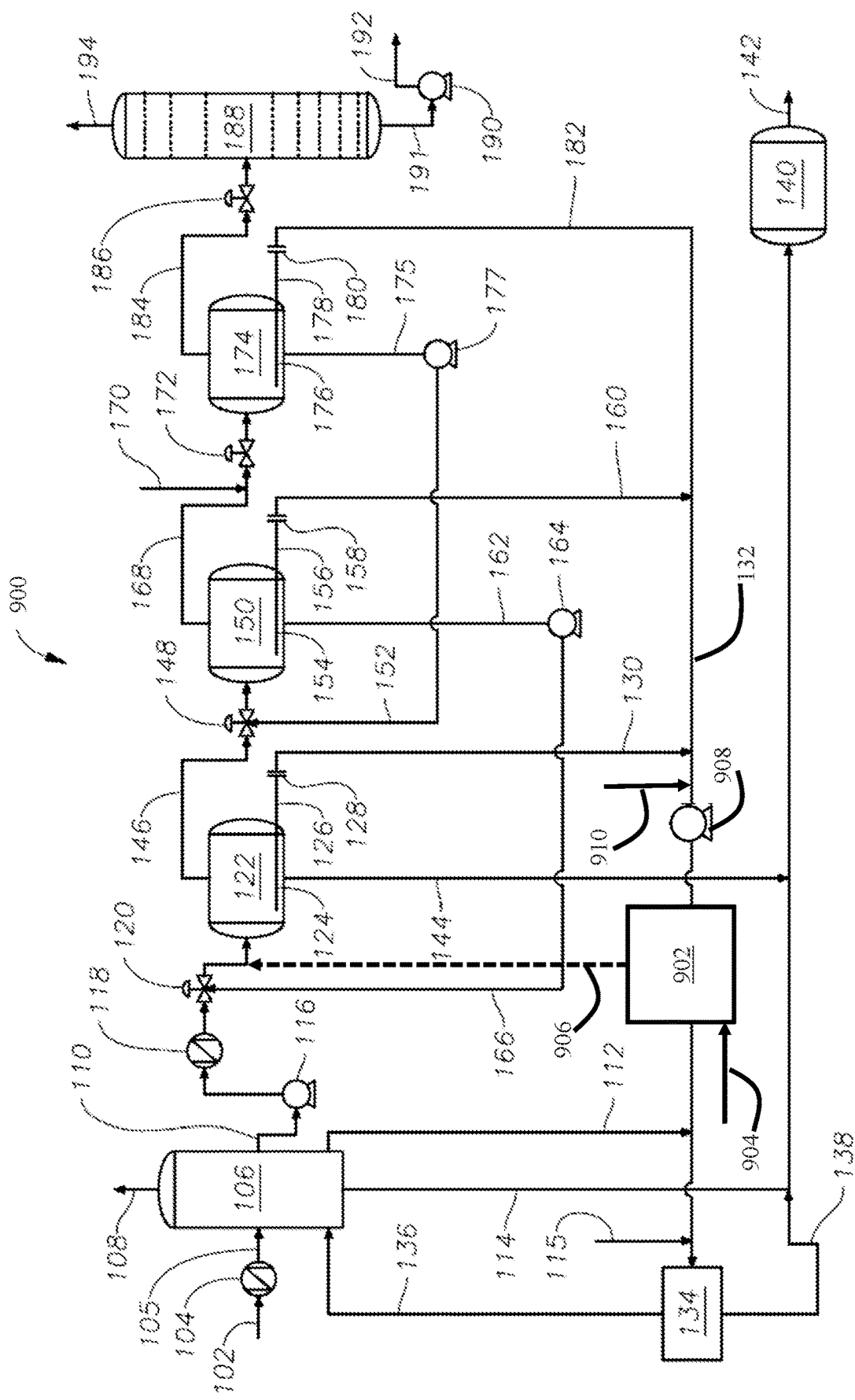
FIG. 9 is a flow diagram showing a GOSP applying continuous RO flow for rag layer removal, along with steam injection for enhanced phase separation and optional rag layer diversion to a dehydrator rather than, or in addition to, a low pressure degassing tank.

FIG. 9 is a flow diagram showing a GOSP applying continuous RO flow for rag layer removal, along with steam injection for enhanced phase separation and optional rag layer diversion to a dehydrator rather than, or in addition to, a low pressure degassing tank. Accurate interface level measurement is not mandatory to control the rag layer in the embodiment of FIG. 9. Restricted orifices 128, 158, and 180 are sized to allow continuous slip stream withdrawal proximate the rag layers at oily water interface skimmers 124, 154, 176, respectively, within dehydrator 122, first stage desalter 150, and second stage desalter 174, respectively. However, in other embodiments, the layout of the embodiment of FIG. 9 can be used with LIC's and control valves with dehydrator 122, first stage desalter 150, and second stage desalter 174, respectively, to remove an automated, continuous, or discontinuous, slip stream of the rag layer in the vessels proximate the oily water interface skimmers 124, 154, 176. LIC's can be used in addition to or alternative to flow indicators and controllers (FIC's).

Recycled rag layer stream 132, optionally along with other oil-in-water emulsion sources 910, proceeds to mixing unit 902 for mixing with steam from steam injection stream 904 (either or both of externally modulated steam and DSI). Mixing unit 902 can include one or more steam injection nozzles, for example DSI, to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. This results in advantageously improved water separation downstream of mixing unit 902 either or both in LPDT 106, or in dehydrator 122 via oil-water stream 906. A steam treated emulsion layer stream can be sent back to the dehydrator 122 via pump 908, operating at for example about 150 psig, and oil-water stream 906, or it can be returned to the LPDT 106 following optional additional treatment in three-phase separation vessel with insulated electrostatic electrodes 134.

In some embodiments, a dehydrator, such as for example dehydrator 122, operating pressure range is between about 100 psig to about 200 psig depending, in part, on the type of crude oil and system hydraulics. Pump 908 is required to provide an additional header pressure of about 50 psig to about 100 psig to match the incoming pressure to the dehydrator, in some embodiments of operation.

Depending on the amount of rag layer in GOSP system 900 requiring treatment and difficulty of treatment, all of the steam-treated emulsion can be pumped back to dehydrator 122 using pump 908 and oil-water stream 906, a portion of the steam-treated emulsion can be pumped back to dehydrator 122 using pump 908 and oil-water stream 906 with a portion proceeding for further treatment in three-phase separation vessel with insulated electrostatic electrodes 134, or all of the steam-treated emulsion can proceed for further treatment in three-phase separation vessel with insulated electrostatic electrodes 134. For example, insulated electrostatic electrodes can be set to 100% deactivated at 100% water cut, and therefore no further treatment beyond mixing unit 902 would be required in three-phase separation vessel with insulated electrostatic electrodes 134 if 100% water cut were detected, so all steam-treated emulsion from mixing unit 902 could proceed back to dehydrator 122 via oil-water stream 906.

Figure 10:
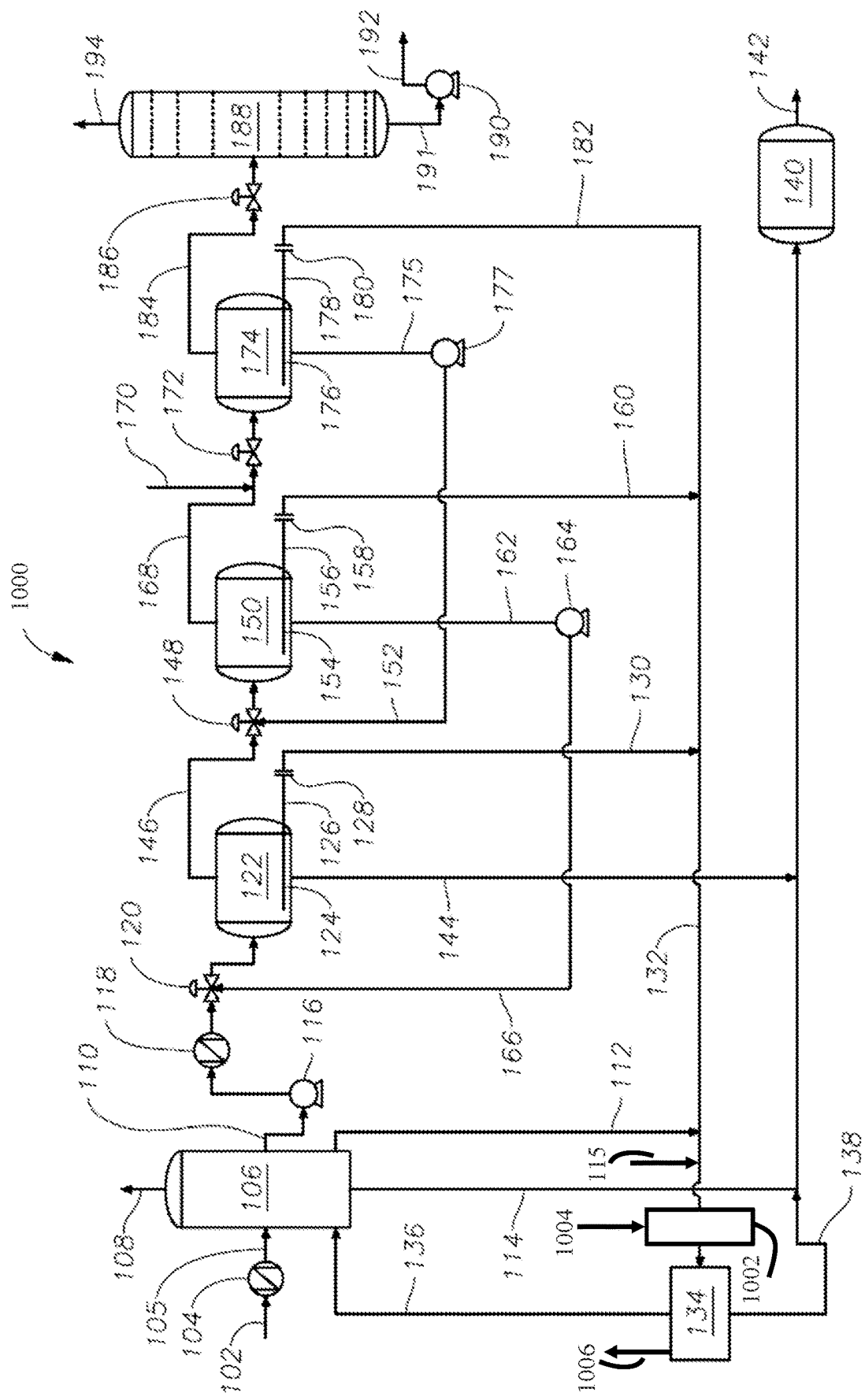
FIG. 10 is a flow diagram showing a GOSP applying continuous RO flow for rag layer removal, along with insulated electrostatic electrodes inside a three-phase separation vessel and steam injection for enhanced phase separation.

FIG. 10 is a flow diagram showing a GOSP applying continuous RO flow for rag layer removal, along with insulated electrostatic electrodes inside a three-phase separation vessel and steam injection for enhanced phase separation. Accurate interface level measurement is not mandatory to control the rag layer in the embodiment of FIG. 10. Restricted orifices 128, 158, and 180 are sized to allow continuous slip stream withdrawal proximate the rag layers at oily water interface skimmers 124, 154, 176, respectively, within dehydrator 122, first stage desalter 150, and second stage desalter 174, respectively.

Recycled rag layer stream 132, optionally along with other oil-in-water emulsion sources 115, proceeds to mixing unit 1002 for mixing with steam from steam injection stream 1004 (either or both externally modulated steam or DSI). Mixing unit 1002 can include one or more steam injection nozzles to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. In some GOSP's, heating crude for treatment prior to the dehydrators and desalters in a trim heater, for example, trim heat exchanger 118, is not available. Therefore, steam injection upstream of a three-phase separator aids in breaking emulsions and increases water separation in synergistic addition to the electrostatic effect in an electrostatic separator, such as three-phase separation vessel with insulated electrostatic electrodes 134. This results in advantageously improved water separation downstream of mixing unit 1002 in three-phase separation vessel with insulated electrostatic electrodes 134 and LPDT 106, with water to be removed from the process via water outlet stream 138 and water outlet 114.

Any gas separated in three-phase separation vessel with insulated electrostatic electrodes 134 can be vented via line 1006, optionally connected to a flare header (not pictured). Treated crude can be sent back to the LPDT 106 via oil recycle line 136 at between about 3 psig to about 10 psig, or it can be returned to the inlet of a desalting/dehydrating process via a pump, described further with regard to FIG. 9.

Figure 11:
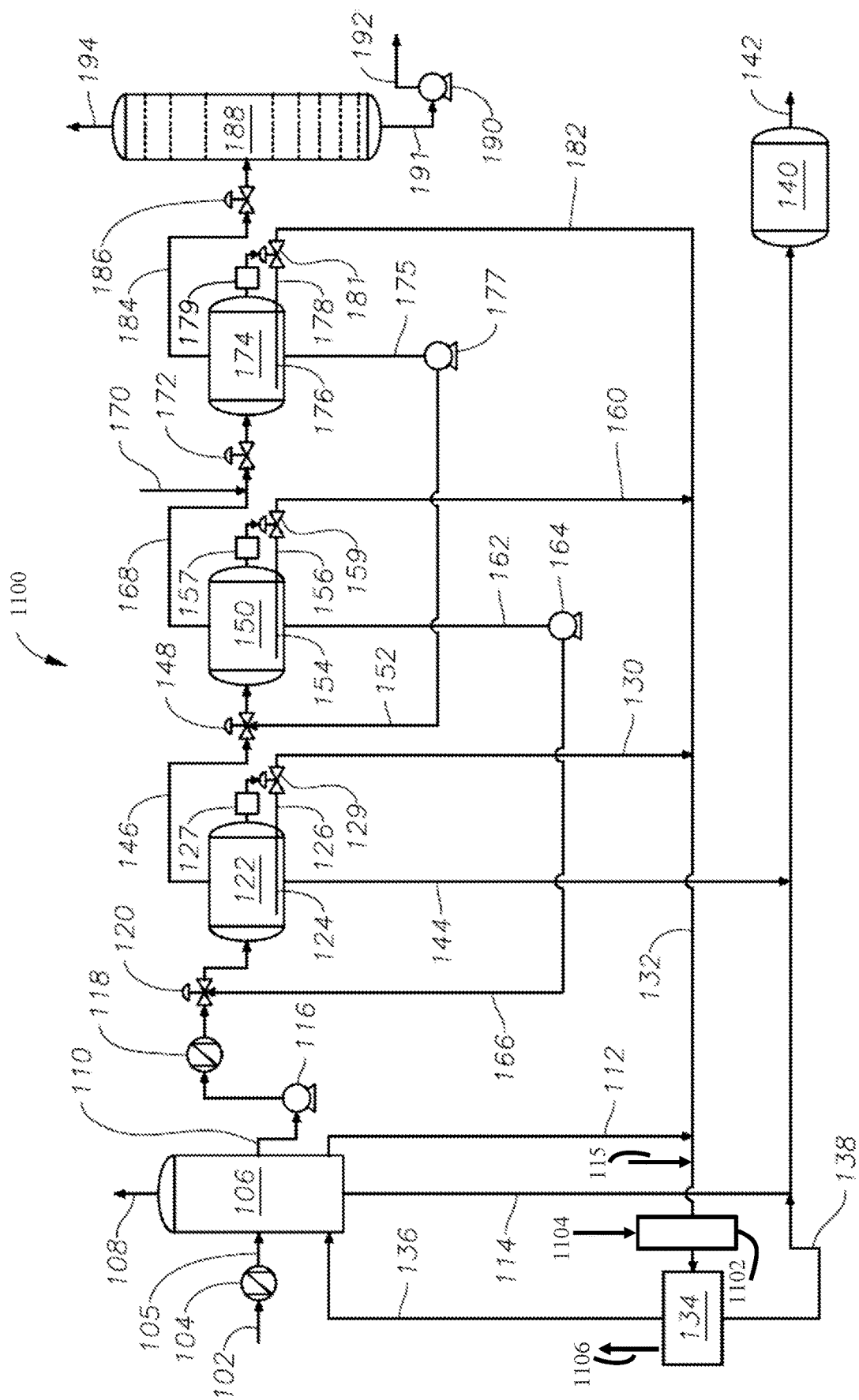
FIG. 11 is a flow diagram showing a GOSP applying controlled, continuous or discontinuous, automatic interface level control flow for rag layer removal, along with insulated electrostatic electrodes inside a three-phase separation vessel and steam injection for enhanced phase separation.

FIG. 11 is a flow diagram showing a GOSP applying controlled, continuous or discontinuous, automatic interface level control flow for rag layer removal, along with insulated electrostatic electrodes inside a three-phase separation vessel and steam injection for enhanced phase separation. In FIG. 11 GOSP system 1100 uses LIC's 127, 157, 179 and control valves 129, 159, 181 with dehydrator 122, first stage desalter 150, and second stage desalter 174, respectively, to remove an automated, continuous, or discontinuous, slip stream of the rag layer in the vessels proximate the oily water interface skimmers 124, 154, 176. LIC's 127, 157, 179 can be used in addition to or alternative to flow indicators and controllers (FIC's).

Recycled rag layer stream 132, optionally along with other oil-in-water emulsion sources 115, proceeds to mixing unit 1102 for mixing with steam from steam injection stream 1104 (either or both externally modulated steam and DSI). Mixing unit 1102 can include one or more steam injection nozzles to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. In some GOSP's, heating crude for treatment prior to the dehydrators and desalters in a trim heater, for example, trim heat exchanger 118, is not available. Therefore, steam injection upstream of a three-phase separator aids in breaking emulsions and increases water separation in synergistic addition to the electrostatic effect in an electrostatic separator, such as three-phase separation vessel with insulated electrostatic electrodes 134. This results in advantageously improved water separation downstream of mixing unit 1102 in three-phase separation vessel with insulated electrostatic electrodes 134 and LPDT 106, with water to be removed from the process via water outlet stream 138 and water outlet 114.

Any gas separated in three-phase separation vessel with insulated electrostatic electrodes 134 can be vented via line 1106, optionally connected to a flare header (not pictured). Treated crude can be sent back to the LPDT 106 via oil recycle line 136 at between about 3 psig to about 10 psig, or it can be returned to the inlet of a desalting/dehydrating process via a pump, described further with regard to FIG. 9.

Figure 12:
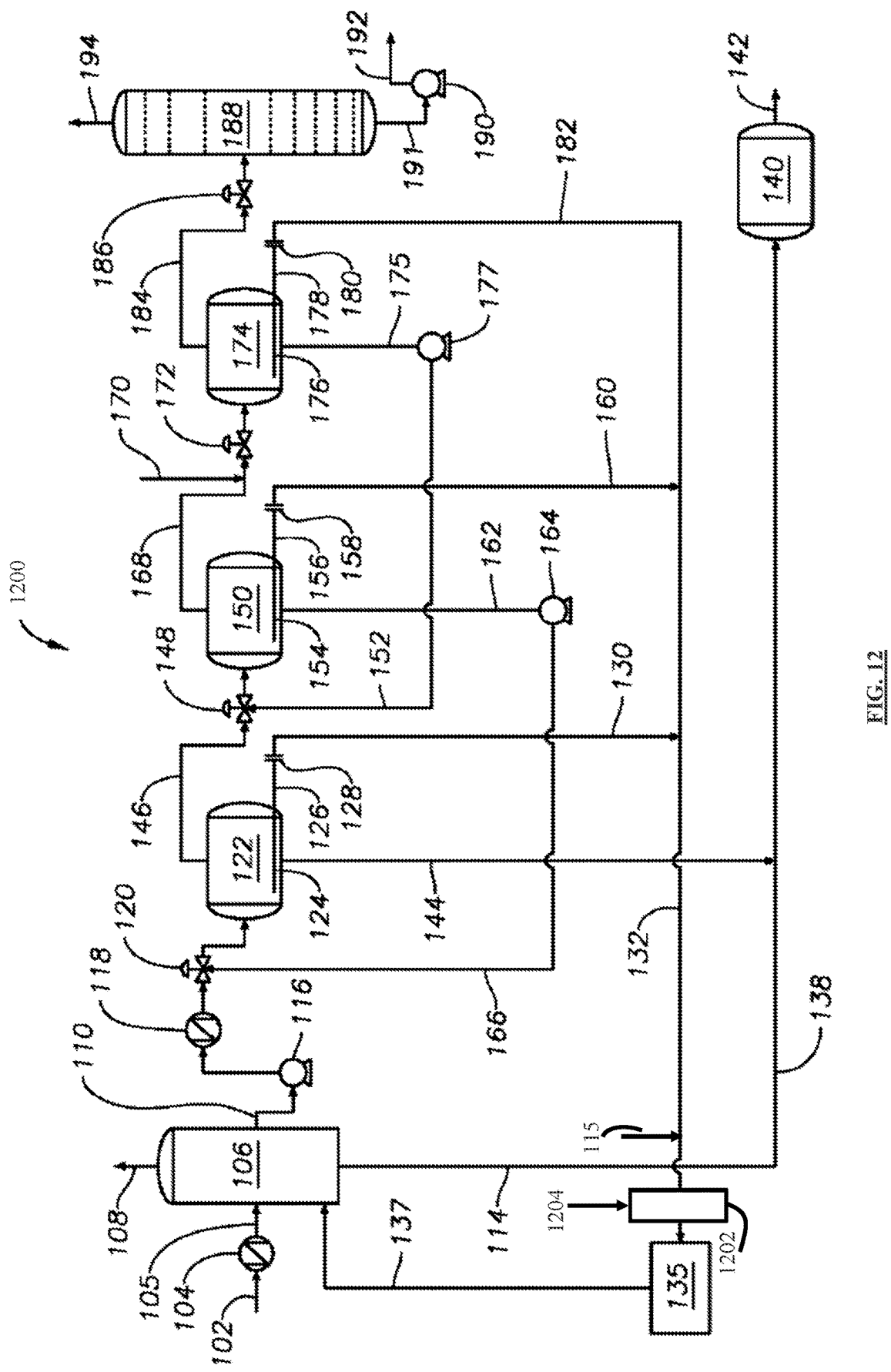
FIG. 12 is a flow diagram showing a GOSP applying continuous RO flow for rag layer removal, along with insulated electrostatic electrodes inside a spool of pipe and steam injection for enhanced phase separation.

FIG. 12 is a flow diagram showing a GOSP applying continuous RO flow for rag layer removal, along with insulated electrostatic electrodes inside a spool of pipe and steam injection for enhanced phase separation. Accurate interface level measurement is not mandatory to control the rag layer in the embodiment of FIG. 12. Restricted orifices 128, 158, and 180 are sized to allow continuous slip stream withdrawal proximate the rag layers at oily water interface skimmers 124, 154, 176, respectively, within dehydrator 122, first stage desalter 150, and second stage desalter 174, respectively. Rather than a three-phase separator such as three-phase separation vessel with insulated electrostatic electrodes 134 shown in FIGS. 9-11, FIG. 12 includes a spool of pipe fitted with insulated electrostatic electrodes 135, and the whole treated rag layer is sent back to the LPDT 106 via stream 137. In other embodiments, a spool of pipe fitted with insulated electrostatic electrodes can be disposed in other locations of a GOSP system, such as for example GOSP system 300, and in other embodiments a spool of pipe fitted with insulated electrostatic electrodes can be used in addition to a three-phase separator (preceding or following), such as for example three-phase separation vessel with insulated electrostatic electrodes 134 shown in FIGS. 1 and 2.

In spool of pipe fitted with insulated electrostatic electrodes 135, when there is 100% water cut, the electrodes can be set to be 100% deactivated, as the layers being withdrawn from dehydrator 122, first stage desalter 150, and second stage desalter 174 are substantially all water, and do not include an oily water emulsion for treatment.

In FIG. 12, recycled rag layer stream 132, optionally along with other oil-in-water emulsion sources 115, proceeds to mixing unit 1202 for mixing with steam from steam injection stream 1204 (either or both externally modulated steam and DSI). Mixing unit 1202 can include one or more steam injection nozzles to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. In some GOSP's, heating crude for treatment prior to the dehydrators and desalters in a trim heater, for example, trim heat exchanger 118, is not available. Therefore, steam injection upstream of a spool of pipe fitted with insulated electrostatic electrodes, such as a spool of pipe fitted with insulated electrostatic electrodes 135, aids in breaking emulsions and increases water separation in synergistic addition to the electrostatic effect in the spool of pipe. This results in advantageously improved water separation downstream of mixing unit 1202 in spool of pipe fitted with insulated electrostatic electrodes 135 and LPDT 106, with water to be removed from the process via water outlet 114.

Treated crude can be sent back to the LPDT 106 via stream 137 at between about 3 psig to about 10 psig, or it can be returned to the inlet of a desalting/dehydrating process via a pump, described further with regard to FIG. 9.

Figure 13:
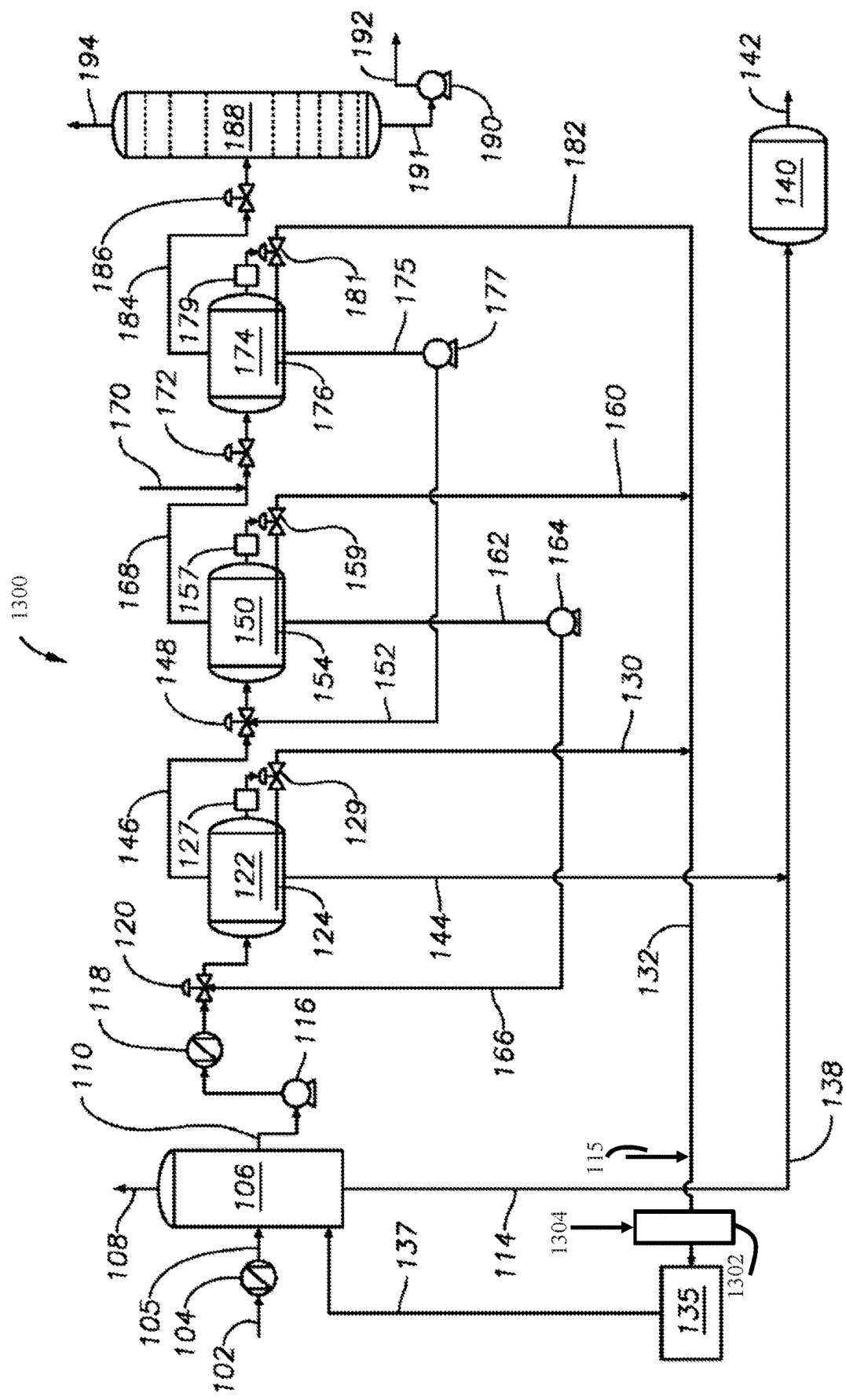
FIG. 13 is a flow diagram showing a GOSP applying controlled, continuous or discontinuous automatic interface level control flow for rag layer removal, along with insulated electrostatic electrodes inside a spool of pipe and steam injection for enhanced phase separation.

FIG. 13 is a flow diagram showing a GOSP applying controlled, continuous or discontinuous automatic interface level control flow for rag layer removal, along with insulated electrostatic electrodes inside a spool of pipe and steam injection for enhanced phase separation. In FIG. 13 GOSP system 1300 uses LIC's 127, 157, 179 and control valves 129, 159, 181 with dehydrator 122, first stage desalter 150, and second stage desalter 174, respectively, to remove an automated, continuous, or discontinuous, slip stream of the rag layer in the vessels proximate the oily water interface skimmers 124, 154, 176. LIC's 127, 157, 179 can be used in addition to or alternative to flow indicators and controllers (FTC's). Rather than a three-phase separator such as three-phase separation vessel with insulated electrostatic electrodes 134 shown in FIGS. 9-11, FIG. 13 includes a spool of pipe fitted with insulated electrostatic electrodes 135, and the whole treated rag layer is sent back to the LPDT 106 via stream 137. In other embodiments, a spool of pipe fitted with insulated electrostatic electrodes can be disposed in other locations of a GOSP system, such as for example GOSP system 300, and in other embodiments a spool of pipe fitted with insulated electrostatic electrodes can be used in addition to a three-phase separator (preceding or following), such as for example three-phase separation vessel with insulated electrostatic electrodes 134 shown in FIGS. 1 and 2.

In spool of pipe fitted with insulated electrostatic electrodes 135, when there is 100% water cut, the electrodes can be set to be 100% deactivated, as the layers being withdrawn from dehydrator 122, first stage desalter 150, and second stage desalter 174 are substantially all water, and do not include an oily water emulsion for treatment.

In FIG. 13, recycled rag layer stream 132, optionally along with other oil-in-water emulsion sources 115, proceeds to mixing unit 1302 for mixing with steam from steam injection stream 1304 (either or both externally modulated steam and DSI). Mixing unit 1302 can include one or more steam injection nozzles to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. In some GOSP's, heating crude for treatment prior to the dehydrators and desalters in a trim heater, for example, trim heat exchanger 118, is not available. Therefore, steam injection upstream of a spool of pipe fitted with insulated electrostatic electrodes, such as a spool of pipe fitted with insulated electrostatic electrodes 135, aids in breaking emulsions and increases water separation in synergistic addition to the electrostatic effect in the spool of pipe. This results in advantageously improved water separation downstream of mixing unit 1302 in spool of pipe fitted with insulated electrostatic electrodes 135 and LPDT 106, with water to be removed from the process via water outlet 114.

Treated crude can be sent back to the LPDT 106 via stream 137 at between about 3 psig to about 10 psig, or it can be returned to the inlet of a desalting/dehydrating process via a pump, described further with regard to FIG. 9.

Figure 14:
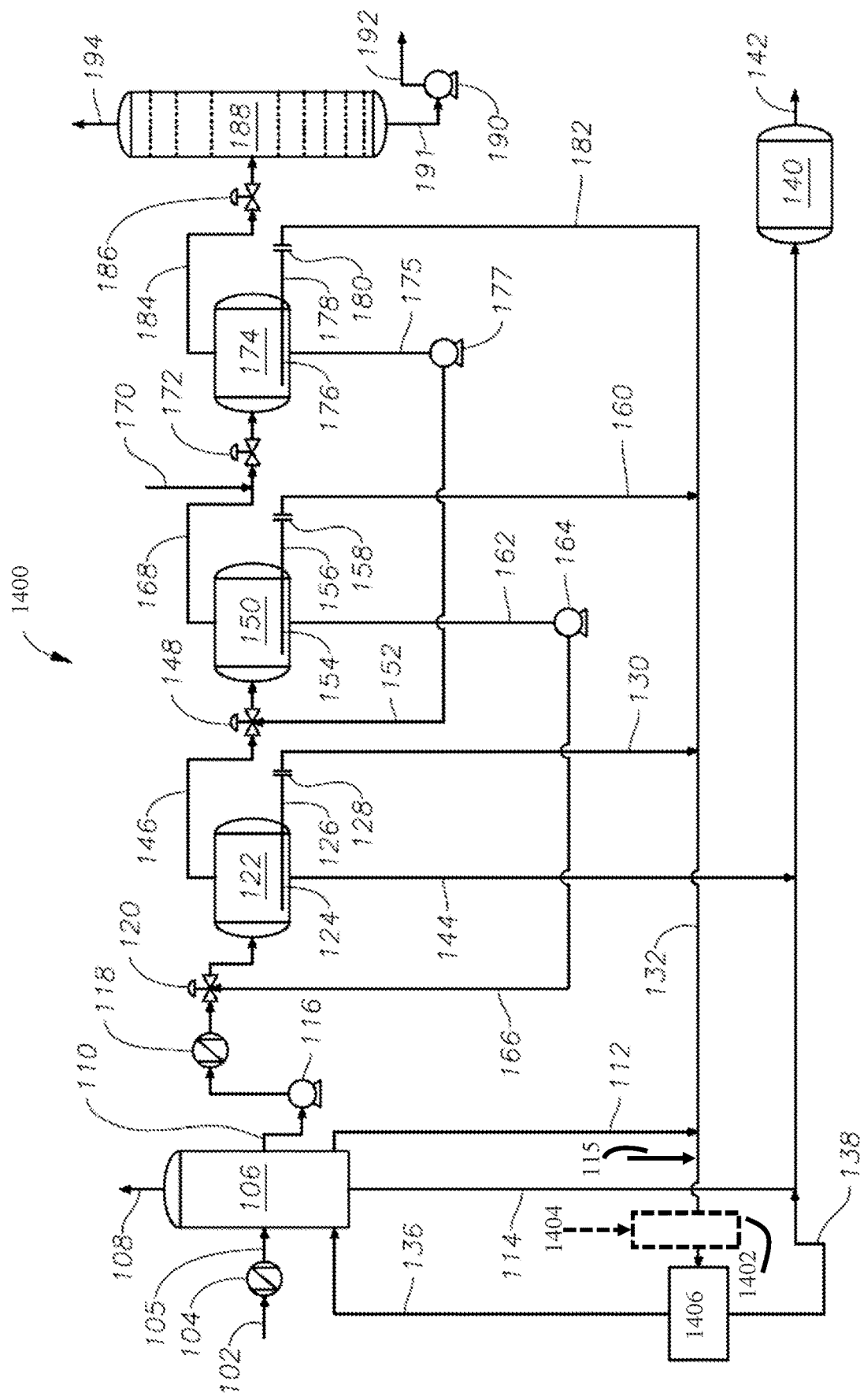
FIG. 14 is a flow diagram showing a GOSP applying continuous RO flow for rag layer removal, along with an oil water phase separation technology including any one of or any combination of a membrane separation device, a centrifugal separator device, and an evaporative concentration system, the oil water phase separation technology optionally preceded by steam injection for enhanced phase separation.

FIG. 14 is a flow diagram showing a GOSP applying continuous RO flow for rag layer removal, along with an oil water phase separation technology including any one of or any combination of a membrane separation device, a centrifugal separator device, and an evaporative concentration system, the oil water phase separation technology optionally preceded by steam injection for enhanced phase separation. Accurate interface level measurement is not mandatory to control the rag layer in the embodiment of FIG. 14. Restricted orifices 128, 158, and 180 are sized to allow continuous slip stream withdrawal proximate the rag layers at oily water interface skimmers 124, 154, 176, respectively, within dehydrator 122, first stage desalter 150, and second stage desalter 174, respectively.

Rather than a three-phase separator such as three-phase separation vessel with insulated electrostatic electrodes 134 shown in FIGS. 9-11, FIG. 14 includes an emulsion separation unit 1406 including any one of or any combination of a membrane separation device, a centrifugal separator device, and an evaporative concentration system, the emulsion separation unit 1406 optionally preceded by steam injection at mixing unit 1402 for mixing with steam from steam injection stream 1404 (either or both of externally modulated steam and DSI). Mixing unit 1402 can include one or more steam injection nozzles to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. In some GOSP's, heating crude for treatment prior to the dehydrators and desalters in a trim heater, for example, trim heat exchanger 118, is not available. Therefore, steam injection upstream of an emulsion separation unit, such as emulsion separation unit 1406, aids in breaking emulsions and increases water separation in synergistic addition to the emulsion separation unit. This results in advantageously improved water separation downstream of mixing unit 1402 in emulsion separation unit 1406 and LPDT 106, with water to be removed from the process via water outlet stream 138 and water outlet 114. In certain other embodiments, one or more three-phase separator and/or spool of pipe fitted with fully insulated electrostatic electrodes can be used in addition to an emulsion separation unit.

A centrifugal separation system can include one or more centrifuges operable to separate oil and water by differences in density in addition to or alternative to viscosity. Suitable oil dehydration centrifuges can be acquired, for example, from Alfa Laval Corporation of Sweden, including the X-Series disc-stack centrifuge line of products. Suitable units can process 25,000 bpd (170 m³/h) by applying about 5000 to about 8000 G of centrifugal forces and the density difference between oil and water to separate the oil from water. Ultra-fine solids can also be separated from the oil and water phases by centrifugation.

A membrane separation device can include ceramic, polymeric, or vibrational components to separate oil from water. For example, CeraMem® Industrial Ceramic Membrane Systems of Veolia Water Technologies of North America are suitable in some embodiments. Microfiltration (MF) and ultrafiltration (UF) membranes suitable for separating oil from water include materials such as alumina, titania, silica, silicon carbide, and combinations of the same.

Evaporative concentration systems refer to any system applying one or more type of heating with the objective of separating water from the crude oil by vaporizing the water away from the crude oil. Heating in such a system can be applied externally by one or more heat exchanger (for example applying steam, electric, hot oil, and/or burners in a tube and shell type arrangement) or by steam to vaporize water inside the crude oil.

In some embodiments of the present systems, a rag layer for treatment can vary between about 5 to about 20 gallons per minute depending on the dehydrator and desalter number, size, and flow. A system can be designed with excess rag layer capacity for upset scenarios. Treated crude can be sent back to the LPDT 106 via oil recycle line 136 at between about 3 psig to about 10 psig, or it can be returned to the inlet of a desalting/dehydrating process via a pump, described further with regard to FIG. 9.

In other embodiments, an emulsion separation unit can be disposed in other locations of a GOSP system, and in other embodiments either or both of a spool of pipe fitted with insulated electrostatic electrodes and a three-phase separator can be used with an emulsion separation unit such as emulsion separation unit 1406.

Figure 15:
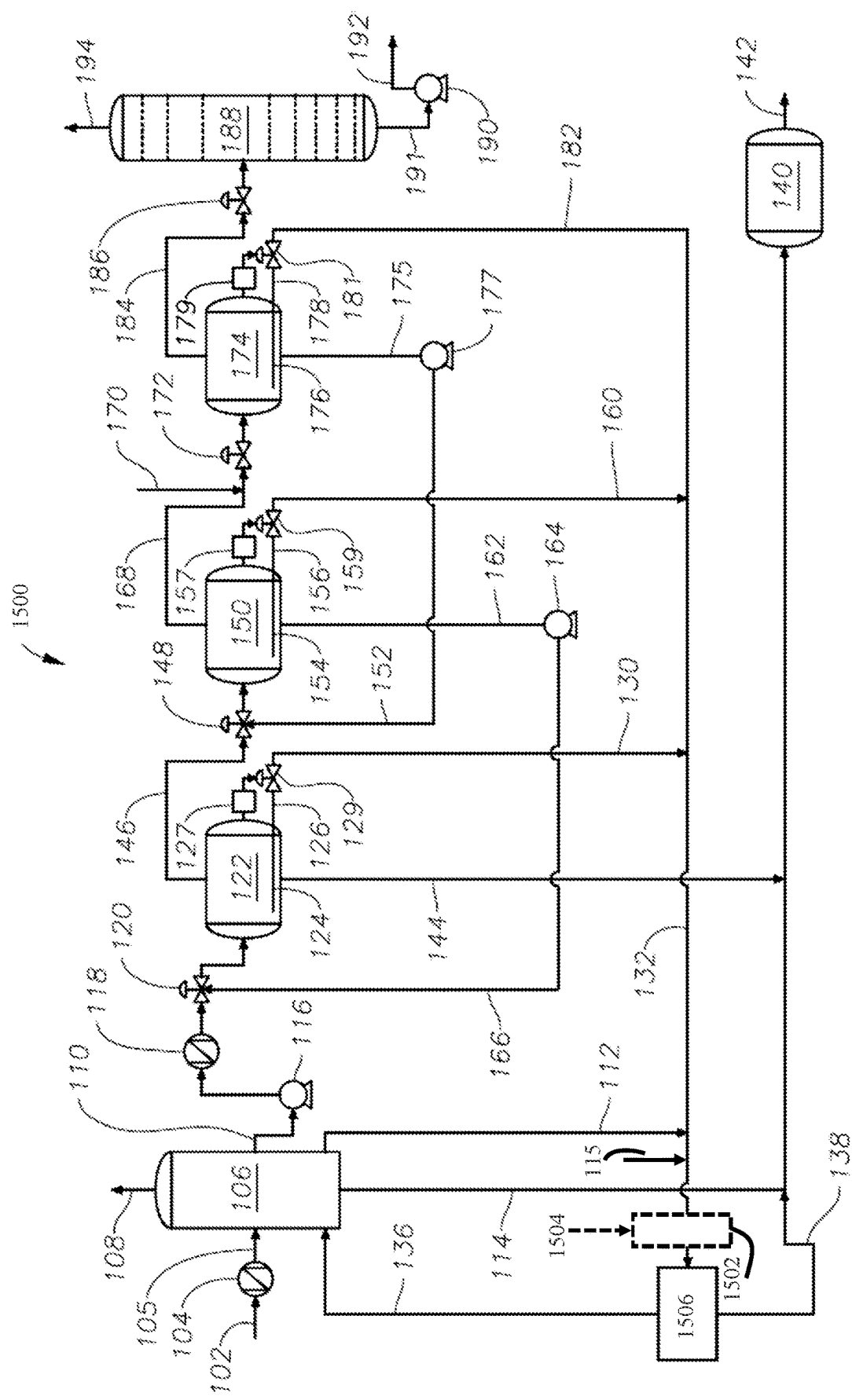
FIG. 15 is a flow diagram showing a GOSP applying controlled, continuous or discontinuous automatic interface level control flow for rag layer removal, along with an oil water phase separation technology including any one of or any combination of a membrane separation device, a centrifugal separator device, and an evaporative concentration system, the oil water phase separation technology optionally preceded by steam injection for enhanced phase separation.

FIG. 15 is a flow diagram showing a GOSP applying controlled, continuous or discontinuous automatic interface level control flow for rag layer removal, along with an oil water phase separation technology including any one of or any combination of a membrane separation device, a centrifugal separator device, and an evaporative concentration system, the oil water phase separation technology optionally preceded by steam injection for enhanced phase separation. In FIG. 15 GOSP system 1500 uses LIC's 127, 157, 179 and control valves 129, 159, 181 with dehydrator 122, first stage desalter 150, and second stage desalter 174, respectively, to remove an automated, continuous, or discontinuous, slip stream of the rag layer in the vessels proximate the oily water interface skimmers 124, 154, 176. LIC's 127, 157, 179 can be used in addition to or alternative to flow indicators and controllers (FIC's).

Rather than a three-phase separator such as three-phase separation vessel with insulated electrostatic electrodes 134 shown in FIGS. 9-11, FIG. 15 includes an emulsion separation unit 1506 including any one of or any combination of a membrane separation device, a centrifugal separator device, and an evaporative concentration system, the emulsion separation unit 1506 optionally preceded by steam injection at mixing unit 1502 for mixing with steam from steam injection stream 1504 (either or both of externally modulated steam and DSI). Mixing unit 1502 can include one or more steam injection nozzles to mix recycled rag layer stream 132 with low or high pressure steam, for example available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate. In some GOSP's, heating crude for treatment prior to the dehydrators and desalters in a trim heater, for example, trim heat exchanger 118, is not available. Therefore, steam injection upstream of an emulsion separation unit, such as emulsion separation unit 1506, aids in breaking emulsions and increases water separation in synergistic addition to the emulsion separation unit. This results in advantageously improved water separation downstream of mixing unit 1502 in emulsion separation unit 1506 and LPDT 106, with water to be removed from the process via water outlet stream 138 and water outlet 114.

Treated crude can be sent back to the LPDT 106 via oil recycle line 136 at between about 3 psig to about 10 psig, or it can be returned to the inlet of a desalting/dehydrating process via a pump, described further with regard to FIG. 9.

In other embodiments, an emulsion separation unit can be disposed in other locations of a GOSP system, and in other embodiments either or both of a spool of pipe fitted with insulated electrostatic electrodes and a three-phase separator can be used with an emulsion separation unit such as emulsion separation unit 1506.

Figure 16:
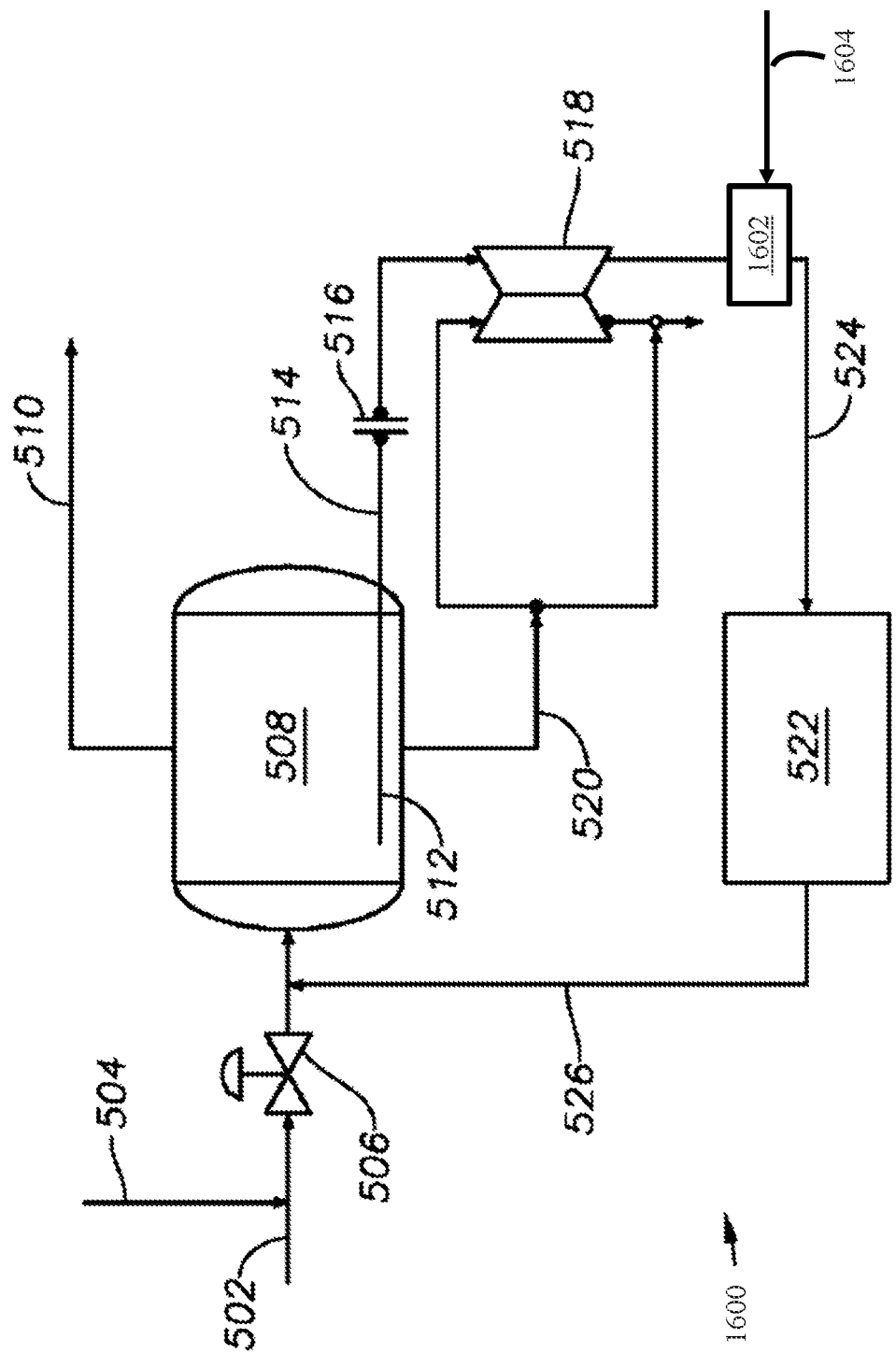
FIG. 16 is a flow diagram showing an example embodiment for treatment of a rag layer from a desalter using a turbocharger and steam injection for enhanced phase separation.

FIG. 16 is a flow diagram showing an example embodiment for treatment of a rag layer from a desalter using a turbocharger and steam injection for enhanced phase separation. In system 1600, crude oil inlet stream 502 is mixed with fresh water from fresh water stream 504 in mixing valve 506, before entering a desalter 508. Treated crude oil exits desalter 508 by stream 510, and proximate an oily water interface skimmer 512, a rag layer stream 514 is withdrawn through RO 516 to a turbocharger 518. Water stream 520 from the bottom of desalter 508 is also conveyed to turbocharger 518. Turbocharger 518 is used to boost the pressure of the emulsion slip stream (recycled rag layer or oily water emulsion) before being fed to a mixing unit 1602 for mixing with steam from steam stream 1604 (using either or both of externally modulated steam and DSI), and before proceeding to spool of pipe fitted with fully insulated electrostatic electrodes 522. Mixing unit 1602 can include one or more steam injection nozzles to mix a rag layer with low or high pressure steam, for example steam available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate.

The electrodes in spool of pipe fitted with fully insulated electrostatic electrodes 522 can be programmed to be 100% deactivated when the incoming stream 524 is 100% water. The treated rag layer from the pipe fitted with fully insulated electrostatic electrodes 522 is recycled via stream 526 back to desalter 508 to be mixed with crude oil.

For the embodiment of FIG. 16, this is one method to apply in refineries in which there is no low pressure storage tank(s) available prior to the desalters, for example. A turbocharger is installed to restore the energy (pressure) to the water stream 520 and to boost the rag layer stream 514 for recycling it back to the desalter 508 inlet at higher pressure.

Notably, the layout of the turbocharger treatment shown in FIG. 16 could be applied in a variety of configurations to the dehydrators, in addition to or alternative to the desalters shown in FIGS. 7-15 and explained previously.

FIG. 17 is a flow diagram showing an example embodiment for treatment of a rag layer from a LPDT using a recycle pump and steam injection for enhanced phase separation. A flow diagram is provided showing an example embodiment for treatment of a rag layer from a LPDT. In system 1700, crude oil inlet stream 602 proceeds through valve 604 before entering LPDT 606. Hydrocarbon gases exit LPDT by off-gas stream 608, and treated crude oil proceeds to desalters via outlet stream 610. An oily water interface skimmer 612 allows a recycled rag layer (oily water emulsion) 614 to proceed out of LPDT 606 and through RO 616, after which it proceeds to a mixing unit 1702 for mixing with steam from steam stream 1704, and it is then recycled by recycle pump 618 to a pipe fitted with fully insulated electrostatic electrodes 620. Treated oily water emulsion (rag layer) returns to LPDT 606 by recycle stream 622. Oily water exits the bottom of LPDT 606 by stream 624. Mixing unit 1702 can include one or more steam injection nozzles to mix a rag layer with low or high pressure steam, for example steam available at a temperature of about 300° F. and a pressure of about 50 psig or more. Steam injection can heat and break an oil-in-water emulsion in an emulsion rag layer. Heating a rag layer lessens its viscosity and consequently increases the water droplet coalescing and settling rate.

The electrodes can be programmed to be 100% deactivated when the incoming stream 623 is 100% water. The treated rag layer from the pipe fitted with fully insulated electrostatic electrodes 620 is recycled via stream 622 back to LPDT 606 to be mixed with crude oil. The embodiment of FIG. 17 shows one system and method for breaking an emulsion in about atmospheric pressure wet crude oil storage tanks. A restricted orifice can be used to control the flow, in addition to or alternative to a LIC/FIC/control valve combination. One objective of the pressure boosting in FIGS. 16 and 17 is to provide enough head to recycle the flow back to the tank inlets for recycle.

Notably, the layout of the LPDT shown in FIG. 17 could be applied in a variety of configurations to the LPDT's shown in FIGS. 7-15 and explained previously.

The singular forms "a," "an," and "the" include plural referents, unless the context clearly dictates otherwise. The term "about" when used with respect to a value or range refers to values including plus and minus 5% of the given value or range.

In the drawing and specification, there have been disclosed example embodiments of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A method for treating a rag layer in a gas oil separation plant process, the method comprising:
    withdrawing the rag layer from a first vessel proximate an oil water interface;
    conveying the rag layer to a separation device, the separation device operable to separate oil and water; and
    recycling separated oil from the separation device back to a second vessel of the gas oil separation plant process, where the withdrawing the rag layer is in part based on a pressure differential between a pressure in the first vessel and a pressure in the second vessel, the pressure in the first vessel being greater than the pressure in the second vessel; and
    operating a water level control valve in response to a deactivation signal from insulated electrostatic electrodes to reduce a water level in the first vessel to below an oily water interface skimmer such that the oil water interface is proximate the oily water interface skimmer.

2. The method according to claim 1, where withdrawing the rag layer from the first vessel occurs in a vessel selected from the group consisting of: a dehydrator and a desalter.

3. The method according to claim 1, where the separation device comprises at least one component selected from the group consisting of: a three-phase separation device equipped with the insulated electrostatic electrodes; a spool of pipe equipped with the insulated electrostatic electrodes; an external steam modulation unit; a direct steam injection mixing unit; a membrane-based separation device; a centrifugal separator; and an evaporative concentration system comprising a heat exchanger.

4. The method according to claim 3, where the separation device comprises the direct steam injection mixing unit.

5. The method according to claim 3, where the separation device comprises the direct steam injection mixing unit to apply steam to the rag layer at a temperature of about 300° F. and a pressure of about 50 psig or greater.

6. The method according to claim 4, where the separation device comprises the three-phase separation device equipped with fully insulated electrostatic electrodes following the direct steam injection mixing unit.

7. The method according to claim 4, where the separation device comprises the spool of pipe equipped with fully insulated electrostatic electrodes following the direct steam injection mixing unit.

8. The method according to claim 4, where the separation device comprises the membrane-based separation device following the direct steam injection mixing unit, and where the membrane-based separation device includes at least one membrane material selected from the group consisting of: alumina, titania, silica, silicon carbide, and combinations thereof.

9. The method according to claim 4, where the separation device comprises the centrifugal separator following the direct steam injection mixing unit.

10. The method according to claim 4, where the separation device comprises the evaporative concentration system following the direct steam injection mixing unit.

11. The method according to claim 1, where withdrawing the rag layer from the first vessel proximate an oil water interface includes withdrawing the rag layer from the first vessel proximate oily water interface skimmer.

12. The method according to claim 1, where conveying the rag layer to the separation device includes conveying the rag layer through a restricted orifice.

13. The method according to claim 12, where withdrawing is continuous during operation of the gas oil separation plant process.

14. The method according to claim 1, where withdrawing is controlled in part by a level indicator and controller in communication with the first vessel and in communication with a control valve, the control valve in fluid communication with the first vessel.

15. The method according to claim 1, further comprising discontinuing conveying the rag layer to the separation device when the separation device detects about 100% water being withdrawn from the first vessel.

16. The method according to claim 1, further comprising increasing the pressure of the rag layer prior to the conveying.

17. The method according to claim 16, where increasing the pressure includes using at least one of a turbocharger and a pump.

18. The method according to claim 1, further comprising increasing the pressure of the rag layer prior to the recycling.

19. The method according to claim 18, where increasing the pressure includes using at least one of a turbocharger and a pump.

20. The method according to claim 1, where withdrawing the rag layer from the first vessel occurs in a vessel selected from the group consisting of: a dehydrator and a desalter, and recycling separated oil from the separation device back to the second vessel occurs in a vessel selected from the group consisting of: a low pressure degassing tank and a dehydrator.

\* \* \* \* \*